US011972768B2

(12) United States Patent
Kamamoto et al.

(10) Patent No.: US 11,972,768 B2
(45) **Date of Patent: *Apr. 30, 2024**

(54) LINEAR PREDICTION ANALYSIS DEVICE, METHOD, PROGRAM, AND STORAGE MEDIUM

(71) Applicant: NIPPON TELEGRAPH AND TELEPHONE CORPORATION, Tokyo (JP)

(72) Inventors: Yutaka Kamamoto, Atsugi (JP); Takehiro Moriya, Atsugi (JP); Noboru Harada, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,879

(22) Filed: Oct. 21, 2022

(65) Prior Publication Data

US 2023/0042203 A1 Feb. 9, 2023

Related U.S. Application Data

(63) Continuation of application No. 17/120,462, filed on Dec. 14, 2020, now Pat. No. 11,532,315, which is a (Continued)

(30) Foreign Application Priority Data

Jul. 18, 2013 (JP) ................................ 2013-149160

(51) Int. Cl.
*G10L 19/06* (2013.01)
*G10L 19/02* (2013.01)
(Continued)

(52) U.S. Cl.
CPC .......... *G10L 19/06* (2013.01); *G10L 19/0212* (2013.01); *G10L 19/032* (2013.01); (Continued)

(58) Field of Classification Search
None
See application file for complete search history.

(56) References Cited

U.S. PATENT DOCUMENTS 5,774,846 A * 6/1998 Morii .................. G10L 21/0208 704/E19.041
5,819,209 A * 10/1998 Inoue ...................... G10L 25/90 704/218

(Continued)

OTHER PUBLICATIONS

ITU-T Recommendation G.718, "Series G; Transmission Systems and Media, Digital Systems and Networks; Digital terminal equipments—Coding of voice and audio signals," International Telecommunication Union, Jun. 2008 (255 pages).

(Continued)

*Primary Examiner* — Jonathan C Kim
(74) *Attorney, Agent, or Firm* — Oblon, McClelland, Maier & Neustadt, L.L.P.

(57) ABSTRACT

An autocorrelation calculation unit 21 calculates an autocorrelation $R_O(i)$ from an input signal. A prediction coefficient calculation unit 23 performs linear prediction analysis by using a modified autocorrelation $R'_O(i)$ obtained by multiplying a coefficient $w_O(i)$ by the autocorrelation $R_O(i)$. It is assumed here, for each order i of some orders i at least, that the coefficient $w_O(i)$ corresponding to the order i is in a monotonically increasing relationship with an increase in a value that is negatively correlated with a fundamental frequency of the input signal of the current frame or a past frame.

6 Claims, 15 Drawing Sheets

Related U.S. Application Data continuation of application No. 14/905,158, filed as application No. PCT/JP2014/068895 on Jul. 16, 2014, now Pat. No. 10,909,996.

(51) Int. Cl.

| | |
|---|---|
| ***G10L 19/032*** | (2013.01) |
| ***G10L 21/04*** | (2013.01) |
| ***G10L 25/06*** | (2013.01) |
| ***G10L 25/12*** | (2013.01) |
| ***G10L 25/18*** | (2013.01) |
| ***G10L 25/27*** | (2013.01) |

(52) U.S. Cl.

CPC .............. *G10L 21/04* (2013.01); *G10L 25/06* (2013.01); *G10L 25/12* (2013.01); *G10L 25/18* (2013.01); *G10L 25/27* (2013.01)

(56) References Cited

U.S. PATENT DOCUMENTS

| | | | | |
|---|---|---|---|---|
| 6,167,373 | A * | 12/2000 | Morii | G10L 21/0208 704/E19.041 |
| 6,199,035 | B1 * | 3/2001 | Lakaniemi | G10L 19/08 704/207 |
| 6,959,274 | B1 * | 10/2005 | Gao | G10L 19/22 704/E19.048 |
| 9,928,850 | B2 * | 3/2018 | Kamamoto | G10L 25/12 |
| 9,966,083 | B2 * | 5/2018 | Kamamoto | G10L 25/12 |
| 10,115,413 | B2 * | 10/2018 | Kamamoto | G10L 19/06 |
| 10,134,419 | B2 * | 11/2018 | Kamamoto | G10L 25/90 |
| 10,134,420 | B2 * | 11/2018 | Kamamoto | G10L 25/90 |
| 10,163,450 | B2 * | 12/2018 | Kamamoto | G10L 19/06 |
| 10,170,130 | B2 * | 1/2019 | Kamamoto | G10L 25/12 |
| 10,909,996 | B2 * | 2/2021 | Kamamoto | G10L 25/12 |
| 2001/0027391 | A1 * | 10/2001 | Yasunaga | G10L 19/12 704/223 |
| 2004/0002856 | A1 * | 1/2004 | Bhaskar | G10L 19/097 704/219 |
| 2009/0089051 | A1 * | 4/2009 | Ishii | G10L 25/90 704/E19.001 |
| 2011/0022924 | A1 * | 1/2011 | Malenovsky | G10L 19/005 714/752 |
| 2016/0140975 | A1 * | 5/2016 | Kamamoto | G10L 25/12 704/203 |
| 2016/0336019 | A1 * | 11/2016 | Kamamoto | G10L 19/06 |
| 2016/0343387 | A1 * | 11/2016 | Kamamoto | G10L 25/12 |

OTHER PUBLICATIONS

ITU-T Recommendation G.729. "General Aspects of Digital Transmission Systems," International Telecommunication Union, Mar. 1996 (38 pages).

Yoh'ichi Tohkura, et al., "Spectral Smoothing Technique in PARCOR Speech Analysis-Synthesis," IEEE Transactions on Acoustics, Speech, and Signal Processing, vol. ASSP-26, No. 6, Dec. 1978 (pp. 587-596).

International Search Report dated Sep. 16, 2014 in PCT/JP2014/068896 filed Jul. 16, 2014.

Office Action dated Nov. 21, 2016 in Korean Patent Application No. 10-2016-7001218 (w/English translation).

Kawahara (Kawahara, Hideki, Ikuyo Masuda-Katsuse, and Alain De Cheveigne. "Restructuring speech representations using a pitch-adaptive time-frequency smoothing and an instantaneous-frequency-based F0 extraction: Possible role of a repetitive structure in sounds." Speech communication 27.3 (1999): 187-207.).

Saeidi, Rahim, et al. "Temporally weighted linear prediction features for tackling additive noise in speaker verification." IEEE Signal Processing Letters 17.6 (2010): 599-602. (Year: 2010).

Magi, Carlo, et al. "Stabilised weighted linear prediction." Speech Communication 51.5 (2009): 401-411. (Year: 2009).

* cited by examiner

LINEAR PREDICTION ANALYSIS DEVICE, METHOD, PROGRAM, AND STORAGE MEDIUM

CROSS-REFERENCE TO RELATED APPLICATIONS

This application is a continuation of and claims the benefit of priority under 35 U.S.C. § 120 from U.S. application Ser. No. 17/120,462, filed Dec. 14, 2020, which is a continuation of U.S. application Ser. No. 14/905,158 filed Jan. 14, 2016 (now U.S. Pat. No. 10,909,996), the entire contents of which are incorporated herein by reference. U.S. application Ser. No. 14/905,158 is a National Stage of PCT/JP2014/068895 filed Jul. 16, 2014, which claims the benefit of priority under 35 U.S.C. § 119 from Japanese Application No. 2013-149160 filed Jul. 18, 2013.

TECHNICAL FIELD

The present invention relates to analysis techniques for digital time-series signals, such as speech signals, acoustic signals, electrocardiograms, brain waves, magnetoencephalograms, and seismic waves.

BACKGROUND ART

In encoding of speech signals and acoustic signals, encoding methods based on prediction coefficients obtained by performing linear prediction analysis of an input speech signal or acoustic signal are widely used (refer to non-patent literature 1 and 2, for example).

In non-patent literature 1 to 3, the prediction coefficients are calculated by a linear prediction analysis device exemplified in FIG. 15. A linear prediction analysis device 1 includes an autocorrelation calculation unit 11, a coefficient multiplication unit 12, and a prediction coefficient calculation unit 13.

The input signal, which is a digital speech signal or a digital acoustic signal in the time domain, is processed in frames of N samples each. The input signal of the current frame, which is the frame to be processed at the present time, is expressed by $X_O(n)$ (n=0, 1, . . . , N−1), where n represents the sample number of a sample in the input signal, and N is a predetermined positive integer. The input signal of the frame one frame before the current one is $X_O(n)$ (n=−N, −N+1, . . . , −1), and the input signal of the frame one frame after the current one is $X_O(n)$ (n=N, N+1, . . . , 2N−1).

[Autocorrelation Calculation Unit 11]

The autocorrelation calculation unit 11 of the linear prediction analysis device 1 calculates an autocorrelation $R_O(i)$ (i=0, 1, . . . , $P_{max}$) from the input signal $X_O(n)$ by expression (11), where $P_{max}$ is a predetermined positive integer smaller than N.

[Formula 1]

$$R_O(i) = \sum_{n=i}^{N-1} X_O(n) \times X_O(n-i) \tag{11}$$

[Coefficient Multiplication Unit 12]

The coefficient multiplication unit 12 then multiplies the autocorrelation $R_O(i)$ by a predetermined coefficient $w_O(i)$ (i=0, 1, . . . , $P_{max}$) of the same i to obtain a modified autocorrelation $R'_O(i)$ (i=0, 1, . . . , $P_{max}$). That is, the modified autocorrelation $R'_O(i)$ is given by expression (12).

[Formula 2]

$$R'_O(i) = R_O(i) \times w_O(i) \tag{12}$$

[Prediction Coefficient Calculation Unit 13]

The prediction coefficient calculation unit 13 uses $R'_O(i)$ to calculate coefficients that can be transformed to first-order to $P_{max}$-order, which is a predetermined maximum order, linear prediction coefficients by using, for example, the Levinson-Durbin method. The coefficients that can be transformed to linear prediction coefficients include PARCOR coefficients $K_O(1)$, $K_O(2)$, . . . , $K_O(P_{max})$ and linear prediction coefficients $a_O(1)$, $a_O(2)$, . . . , $a_O(P_{max})$.

ITU-T Recommendation G.718 (non-patent literature 1) and ITU-T Recommendation G.729 (non-patent literature 2) use a fixed 60-Hz-bandwidth coefficient, which has been obtained beforehand, as the coefficient $w_O(i)$.

More specifically, the coefficient $w_O(i)$ is defined by using an exponential function, as given by expression (13). In expression (3), a fixed value of $f_0$=60 Hz is used and $f_s$ is a sampling frequency.

[Formula 3]

$$w_O(i) = \exp\left(-\frac{1}{2}\left(\frac{2\pi f_0 i}{f_s}\right)^2\right),\ i = 1, 2, \ldots , P_{max} \tag{13}$$

Non-patent literature 3 presents an example using a coefficient based on a function other than the exponential function. The function used there is based on a sampling period τ (equivalent to a period corresponding to $f_s$) and a predetermined constant a and likewise uses a fixed-value coefficient.

PRIOR ART LITERATURE

Non-Patent Literature

Non-patent literature 1: ITU-T Recommendation G.718, ITU, 2008.

Non-patent literature 2: ITU-T Recommendation G.729, ITU, 1996

Non-patent literature 3: Yoh'ichi Tohkura, Fumitada ltakura, Shin'ichiro Hashimoto, “Spectral Smoothing Technique in PARCOR Speech Analysis-Synthesis”, IEEE Trans. on Acoustics, Speech, and Signal Processing, Vol. ASSP-26, No. 6, 1978

SUMMARY OF THE INVENTION

Problems to be Solved by the Invention

The conventional linear prediction analysis methods used for encoding speech signals and acoustic signals calculate coefficients that can be transformed to linear prediction coefficients, by using a modified autocorrelation $R'_O(i)$ obtained by multiplying an autocorrelation $R_O(i)$ by a fixed coefficient $w_O(i)$. With an input signal that does not require modification by multiplying the autocorrelation $R_O(i)$ by the coefficient $w_O(i)$, that is, with an input signal in which a spectral peak does not become too large in the spectral envelope corresponding to coefficients that can be transformed to linear prediction coefficients even if the coefficients that can be transformed to the linear prediction coefficients are calculated by using the autocorrelation $R_O(i)$ itself instead of the modified autocorrelation $R'_O(i)$, multiplying the autocorrelation $R_O(i)$ by the coefficient $w_O(i)$ could lower the accuracy of approximation of the spectral envelope of the input signal $X_O(n)$ by the spectral envelope corresponding to the coefficients that can be transformed to the linear prediction coefficients, calculated by using the modified autocorrelation $R'_O(i)$, meaning that the accuracy of linear prediction analysis could be lowered.

An object of the present invention is to provide a linear prediction analysis method, device, program, and storage medium with a higher analysis accuracy than before.

Means to Solve the Problems

A linear prediction analysis method according to one aspect of the present invention obtains, in each frame, which is a predetermined time interval, coefficients that can be transformed to linear prediction coefficients corresponding to an input time-series signal. The linear prediction analysis method includes an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of $i=0, 1, \ldots, P_{max}$ at least; and a prediction coefficient calculation step of calculating coefficients that can be transformed to first-order to $P_{max}$-order linear prediction coefficients, by using a modified autocorrelation $R'_O(i)$ obtained by multiplying a coefficient $w_O(i)$ by the autocorrelation $R_O(i)$ for each i. For each order i of some orders i at least, the coefficient $w_O(i)$ corresponding to the order i is in a monotonically increasing relationship with an increase in a period, a quantized value of the period, or a value that is negatively correlated with a fundamental frequency based on the input time-series signal of the current frame or a past frame.

A linear prediction analysis method according to another aspect of the present invention obtains, in each frame, which is a predetermined time interval, coefficients that can be transformed to linear prediction coefficients corresponding to an input time-series signal. The linear prediction analysis method includes an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of $i=0, 1, \ldots, P_{max}$ at least; a coefficient determination step of obtaining a coefficient $w_O(i)$ from a single coefficient table of two or more coefficient tables by using a period, a quantized value of the period, or a value that is negatively correlated with the fundamental frequency based on the input time-series signal of the current frame or a past frame, the two or more coefficient tables each storing orders i of $i=0, 1, \ldots, P_{max}$ in association with coefficients $w_O(i)$ corresponding to the orders i; and a prediction coefficient calculation step of calculating coefficients that can be transformed to first-order to $P_{max}$-order linear prediction coefficients, by using a modified autocorrelation $R'_O(i)$ obtained by multiplying the obtained coefficient $w_O(i)$ by the autocorrelation $R_O(i)$ for each i. A first coefficient table of the two or more coefficient tables is a coefficient table from which the coefficient $w_O(i)$ is obtained in the coefficient determination step when the period, the quantized value of the period, or the value that is negatively correlated with the fundamental frequency is a first value; a second coefficient table of the two or more coefficient tables is a coefficient table from which the coefficient $w_O(i)$ is obtained in the coefficient determination step when the period, the quantized value of the period, or the value that is negatively correlated with the fundamental frequency is a second value larger than the first value; and for each order i of some orders i at least, the coefficient corresponding to the order i in the second coefficient table is larger than the coefficient corresponding to the order i in the first coefficient table.

A linear prediction analysis method according to another aspect of the present invention obtains, in each frame, which is a predetermined time interval, coefficients that can be transformed to linear prediction coefficients corresponding to an input time-series signal. The linear prediction analysis method includes an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of $i=0, 1, \ldots, P_{max}$ at least; a coefficient determination step of obtaining a coefficient from a single coefficient table of coefficient tables t0, t1, and t2 by using a period, a quantized value of the period, or a value that is negatively correlated with a fundamental frequency based on the input time-series signal of the current frame or a past frame, the coefficient table t0 storing a coefficient $w_{t0}(i)$, the coefficient table t1 storing a coefficient $w_{t1}(i)$, and the coefficient table t2 storing a coefficient $w_{t2}(i)$; and a prediction coefficient calculation step of obtaining coefficients that can be transformed to first-order to $P_{max}$-order linear prediction coefficients, by using a modified autocorrelation $R'_O(i)$ obtained by multiplying the obtained coefficient by the autocorrelation $R_O(i)$ for each i. Depending on the period, the quantized value of the period, or the value that is negatively correlated with the fundamental frequency, the period is classified into one of a case where the period is short, a case where the period is intermediate, and a case where the period is long; the coefficient table t0 is a coefficient table from which the coefficient is obtained in the coefficient determination step when the period is short, the coefficient table t1 is a coefficient table from which the coefficient is obtained in the coefficient determination step when the period is intermediate, and the coefficient table t2 is a coefficient table from which the coefficient is obtained in the coefficient determination step when the period is long; and $w_{t0}(i)<w_{t1}(i)\leq w_{t2}(i)$ is satisfied for at least some orders i, $w_{t0}(i)\leq w_{t1}(i)<w_{t2}(i)$ is satisfied for at least some orders i of the other orders i, and $w_{t0}(i)\leq w_{t1}(i)\leq w_{t2}(i)$ is satisfied for the remaining orders i.

A linear prediction analysis method according to another aspect of the present invention obtains, in each frame, which is a predetermined time interval, coefficients that can be transformed to linear prediction coefficients corresponding to an input time-series signal. The linear prediction analysis method includes an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of $i=0, 1, \ldots, P_{max}$ at least; and a prediction coefficient calculation step of calculating coefficients that can be transformed to first-order to $P_{max}$-order linear prediction coefficients, by using a modified autocorrelation $R'_O(i)$ obtained by multiplying a coefficient $w_O(i)$ by the autocorrelation $R_O(i)$ for each i. For each order i of some orders i at least, the coefficient $w_O(i)$ corresponding to the order i is in a monotonically decreasing relationship with an increase in a value that is positively correlated with a fundamental frequency based on the input time-series signal of the current or a past frame.

A linear prediction analysis method according to another aspect of the present invention obtains, in each frame, which is a predetermined time interval, coefficients that can be transformed to linear prediction coefficients corresponding to an input time-series signal. The linear prediction analysis method includes an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of i=0, 1, . . . , $P_{max}$ at least; a coefficient determination step of obtaining a coefficient $w_O(i)$ from a single coefficient table of two or more coefficient tables by using a value that is positively correlated with a fundamental frequency based on the input time-series signal of the current frame or a past frame, the two or more coefficient tables each storing orders i of i=0, 1, . . . , $P_{max}$ in association with coefficients $w_O(i)$ corresponding to the orders i; and a prediction coefficient calculation step of calculating coefficients that can be transformed to first-order to $P_{max}$-order linear prediction coefficients, by using a modified autocorrelation $R'_O(i)$ obtained by multiplying the obtained coefficient $w_O(i)$ by the autocorrelation $R_O(i)$ for each i. A first coefficient table of the two or more coefficient tables is a coefficient table from which the coefficient $w_O(i)$ is obtained in the coefficient determination step when the value that is positively correlated with the fundamental frequency is a first value; a second coefficient table of the two or more coefficient tables is a coefficient table from which the coefficient $w_O(i)$ is obtained in the coefficient determination step when the value that is positively correlated with the fundamental frequency is a second value smaller than the first value; and for each order i of some orders i at least, the coefficient corresponding to the order i in the second coefficient table is larger than the coefficient corresponding to the order i in the first coefficient table.

A linear prediction analysis method according to another aspect of the present invention obtains, in each frame, which is a predetermined time interval, coefficients that can be transformed to linear prediction coefficients corresponding to an input time-series signal. The linear prediction analysis method includes an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of i=0, 1, . . . , $P_{max}$ at least; a coefficient determination step of obtaining a coefficient from a single coefficient table of coefficient tables t0, t1, and t2 by using a value that is positively correlated with a fundamental frequency based on the input time-series signal of the current frame or a past frame, the coefficient table t0 storing a coefficient $w_{t0}(i)$, the coefficient table t1 storing a coefficient $w_{t1}(i)$, and the coefficient table t2 storing a coefficient $w_{t2}(i)$; and a prediction coefficient calculation step of calculating coefficients that can be transformed to first-order to $P_{max}$-order linear prediction coefficients, by using a modified autocorrelation $R'_O(i)$ obtained by multiplying the obtained coefficient by the autocorrelation $R_O(i)$ for each i. Depending on the value that is positively correlated with the fundamental frequency, the fundamental frequency is classified into one of a case where the fundamental frequency is high, a case where the fundamental frequency is intermediate, and a case where the fundamental frequency is low; the coefficient table t0 is a coefficient table from which the coefficient is obtained in the coefficient determination step when the fundamental frequency is high, the coefficient table t1 is a coefficient table from which the coefficient is obtained in the coefficient determination step when the fundamental frequency is intermediate, and the coefficient table t2 is a coefficient table from which the coefficient is obtained in the coefficient determination step when the fundamental frequency is low; and $w_{t0}(i)<w_{t1}(i)\leq w_{t2}(i)$ is satisfied for some orders i at least, $w_{t0}(i)\leq w_{t1}(i)<w_{t2}(i)$ is satisfied for some orders i at least of the other orders i, and $w_{t0}(i)\leq w_{t1}(i)\leq w_{t2}(i)$ is satisfied for the remaining orders i.

Effects of the Invention

By using a coefficient specified in accordance with a value that is positively correlated with the fundamental frequency or a value that is negatively correlated with the fundamental frequency, as a coefficient by which an autocorrelation is multiplied to obtain a modified autocorrelation, linear prediction can be implemented with a higher analysis accuracy than before.

DETAILED DESCRIPTION OF THE EMBODIMENTS

Embodiments of a linear prediction analysis device and method will be described with reference to the drawings.

First Embodiment

Figure 1:
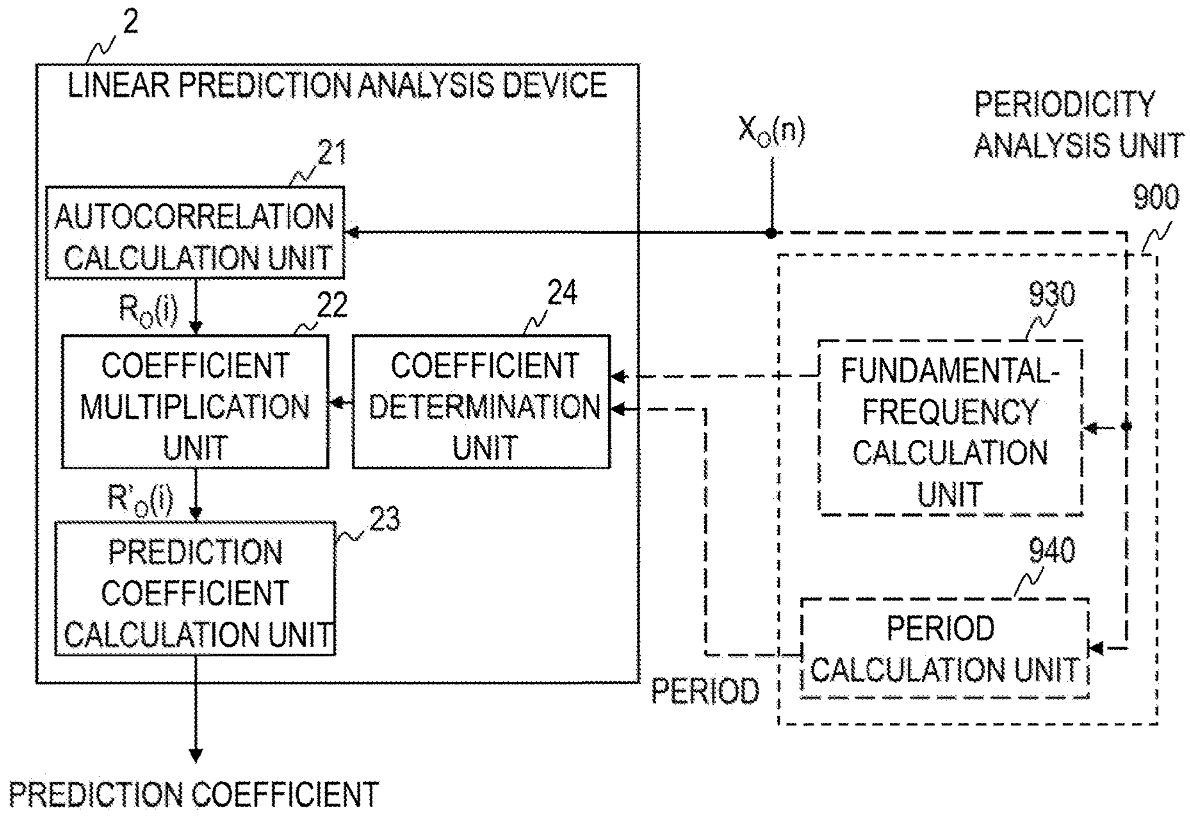
FIG. 1 is a block diagram illustrating an example of a linear prediction device according to a first embodiment and a second embodiment.

A linear prediction analysis device 2 according to a first embodiment includes an autocorrelation calculation unit 21, a coefficient determination unit 24, a coefficient multiplication unit 22, and a prediction coefficient calculation unit 23, for example, as shown in FIG. 1. The operation of the autocorrelation calculation unit 21, the coefficient multiplication unit 22, and the prediction coefficient calculation unit 23 is the same as the operation of the autocorrelation calculation unit 11, the coefficient multiplication unit 12, and the prediction coefficient calculation unit 13, respectively, in the conventional linear prediction analysis device 1.

An input signal $X_O(n)$ input to the linear prediction analysis device 2 can be a digital speech signal, a digital acoustic signal, or a digital signal such as an electrocardiogram, a brain wave, a magnetoencephalogram, and a seismic wave, in the time domain in each frame, which is a predetermined time interval. The input signal is an input time-series signal. The input signal in the current frame is denoted as $X_O(n)$ (n=0, 1, . . . , N−1), where n represents the sample number of a sample in the input signal, and N is a predetermined positive integer. The input signal of the frame one frame before the current one is $X_O(n)$ (n=−N, −N+1, . . . , −1), and the input signal of the frame one frame after the current one is $X_O(n)$ (n=N, N+1, . . . , 2N−1). A case where the input signal $X_O(n)$ is a digital speech signal or a digital acoustic signal will be described below. The input signal $X_O(n)$ (n=0, 1, . . . N−1) can be a recorded sound signal itself, a signal whose sampling rate has been converted for analysis, a signal subjected to pre-emphasis processing, or a windowed signal.

The linear prediction analysis device 2 also receives information about the fundamental frequency of the digital speech signal or the digital acoustic signal in each frame. The information about the fundamental frequency is obtained by a periodicity analysis unit 900 outside the linear prediction analysis device 2. The periodicity analysis unit 900 includes a fundamental-frequency calculation unit 930, for example.

[Fundamental-Frequency Calculation Unit 930]

The fundamental-frequency calculation unit 930 calculates a fundamental frequency P from all or a part of the input signal $X_O(n)$ (n=0, 1, . . . , N−1) of the current frame and/or input signals of frames near the current frame. The fundamental-frequency calculation unit 930 calculates the fundamental frequency P of the digital speech signal or the digital acoustic signal in a signal segment that includes all or a part of the input signal $X_O(n)$ (n=0, 1, . . . , N−1) of the current frame, for example, and outputs information with which the fundamental frequency P can be determined, as information about the fundamental frequency. There are a variety of known methods of obtaining the fundamental frequency, and any of those known methods can be used. Alternatively, the obtained fundamental frequency P may be encoded to a fundamental frequency code, and the fundamental frequency code may be output as the information about the fundamental frequency. Further, a quantized value $\hat{P}$ of the fundamental frequency corresponding to the fundamental frequency code may be obtained, and the quantized value $\hat{P}$ of the fundamental frequency may be output as the information about the fundamental frequency. Specific examples of the fundamental-frequency calculation unit 930 will be described below.

Specific Example 1 of Fundamental-Frequency Calculation Unit 930

In specific example 1 of the fundamental-frequency calculation unit 930, the input signal $X_O(n)$ (n=0, 1, . . . , N−1) of the current frame is constituted of a plurality of subframes, and, for each frame, the fundamental-frequency calculation unit 930 begins its operation earlier than the linear prediction analysis device 2. The fundamental-frequency calculation unit 930 first calculates respective fundamental frequencies $P_{s1}, \ldots, P_{sM}$ of M subframes $X_{Os1}(n)$ (n=0, 1, . . . , N/M−1), . . . , $X_{OsM}(n)$ (n=(M−1)N/M, (M−1)N/M+1, . . . , N−1), where M is an integer not smaller than 2. It is assumed that N is divisible by M. The fundamental-frequency calculation unit 930 outputs information that can determine the maximum value $\max(P_{s1}, \ldots, P_{sM})$ of the fundamental frequencies $P_{s1}, \ldots, P_{sM}$ of the M subframes constituting the current frame, as the information about the fundamental frequency.

Specific Example 2 of Fundamental-Frequency Calculation Unit 930

In specific example 2 of the fundamental-frequency calculation unit 930, a signal segment that includes a look-ahead portion forms the signal segment for the current frame with the input signal $X_O(n)$ (n=0, 1, . . . , N−1) of the current frame and a part of the input signal $X_O(n)$ (n=N, N+1, . . . , N+Nn−1) of the next frame, where Nn is a positive integer satisfying Nn<N, and, for each frame, the fundamental-frequency calculation unit 930 begins its operation later than the linear prediction analysis device 2. The fundamental-frequency calculation unit 930 calculates the fundamental frequencies $P_{now}$ and $P_{next}$ of the input signal $X_O(n)$ (n=0, 1, . . . , N−1) of the current frame and a part of the input signal $X_O(n)$ (n=N, N+1, . . . , N+Nn−1) of the next frame, respectively, in the signal segment for the current frame and stores the fundamental frequency $P_{next}$ in the fundamental-frequency calculation unit 930. As the information about the fundamental frequency, the fundamental-frequency calculation unit 930 outputs information that can determine the fundamental frequency Pw which has been obtained for the signal segment of the preceding frame and stored in the fundamental-frequency calculation unit 930, which is the fundamental frequency calculated for the part of the input signal $X_O(n)$ (n=0, 1, . . . , Nn−1) of the current frame in the signal segment for the preceding frame. The fundamental frequency of each of the plurality of subframes may be obtained for the current frame, as in specific example 1.

Specific Example 3 of Fundamental-Frequency Calculation Unit 930

In specific example 3 of the fundamental-frequency calculation unit 930, the input signal $X_O(n)$ (n=0, 1, . . . , N−1) of the current frame itself forms the signal segment of the current frame, and, for each frame, the fundamental-frequency calculation unit 930 begins its operation later than the linear prediction analysis device 2. The fundamental-frequency calculation unit 930 calculates the fundamental frequency P of the input signal $X_O(n)$ (n=0, 1, . . . , N−1) of the current frame, which forms the signal segment for the current frame, and stores the fundamental frequency P in the fundamental-frequency calculation unit 930. As the information about the fundamental frequency, the fundamental-frequency calculation unit 930 outputs information that can determine the fundamental frequency P calculated in the signal segment for the preceding frame, that is, calculated for the input signal $X_O(n)$ (n=−N, −N+1, . . . , −1) of the preceding frame, and stored in the fundamental-frequency calculation unit 930.

Figure 2:
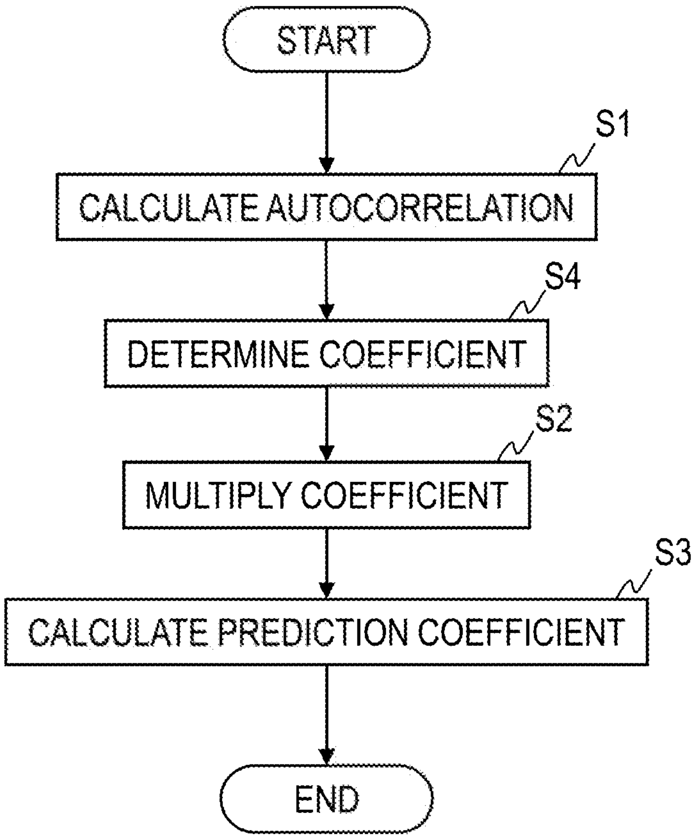
FIG. 2 is a flowchart illustrating an example of a linear prediction analysis method.

The operation of the linear prediction analysis device 2 will be described next. FIG. 2 is a flowchart illustrating a linear prediction analysis method of the linear prediction analysis device 2.

[Autocorrelation Calculation Unit 21]

The autocorrelation calculation unit 21 calculates an autocorrelation $R_O(i)$ (i=0, 1, . . . , $P_{max}$) from the input signal $X_O(n)$ (n=0, 1, . . . , N−1), which is a digital speech signal or a digital audio signal in the time domain in frames of N input samples each (step S1). $P_{max}$ is the maximum order of a coefficient that can be transformed to a linear prediction coefficient calculated by the prediction coefficient calculation unit 23 and is a predetermined positive integer not exceeding N. The calculated autocorrelation $R_O(i)$ (i=0, 1, . . . , $P_{max}$) is supplied to the coefficient multiplication unit 22.

The autocorrelation calculation unit 21 calculates the autocorrelation $R_O(i)$ (i=0, 1, . . . , $P_{max}$) as given by expression (14A), for example, by using the input signal $X_O(n)$. That is, the autocorrelation $R_O(i)$ between the input time-series signal $X_O(n)$ of the current frame and the input time-series signal $X_O(n-i)$ i samples before the input time-series signal $X_O(n)$ is calculated.

[Formula 4]

$$R_O(i) = \sum_{n=i}^{N-1} X_O(n) \times X_O(n-i) \tag{14A}$$

Alternatively, the autocorrelation calculation unit 21 calculates the autocorrelation $R_O(i)$ (i=0, 1, . . . , $P_{max}$) as given by expression (14B), by using the input signal $X_O(n)$. That is, the autocorrelation $R_O(i)$(i=0, 1, . . . , $P_{max}$) between the input time-series signal $X_O(n)$ of the current frame and the input time-series signal $X_O(n+i)$ i samples after the input time-series signal $X_O(n)$ is calculated.

[Formula 5]

$$R_O(i) = \sum_{n=0}^{N-1-i} X_O(n) \times X_O(n+i) \tag{14B}$$

The autocorrelation calculation unit 21 may also obtain a power spectrum corresponding to the input signal $X_O(n)$ and then calculate the autocorrelation $R_O(i)$ (i=0, 1, . . . , $P_{max}$) in accordance with the Wiener-Khinchin theorem. In either way, the autocorrelation $R_O(i)$ may also be calculated by using parts of the input signals of the preceding, the current, and the next frames, such as the input signal $X_O(n)$ (n=−Np, −Np+1, . . . , −1, 0, 1, . . . , N−1, N, . . . , N−1+Nn), where Np and Nn are predetermined positive integers that respectively satisfy relations Np<N and Nn<N. Alternatively, the MDCT series may be used in place of an approximated power spectrum, and the autocorrelation may be obtained from the approximated power spectrum. As described above, some autocorrelation calculation techniques that are known and used in practice can be used here.

[Coefficient Determination Unit 24]

The coefficient determination unit 24 determines the coefficient $w_O(i)$ (i=0, 1, . . . , $P_{max}$) by using the input information about the fundamental frequency (step S4). The coefficient $w_O(i)$ is a coefficient for obtaining the modified autocorrelation $R'_O(i)$ by modifying the autocorrelation $R_O(i)$. The coefficient $w_O(i)$ is also called a lag window $w_O(i)$ or a lag window coefficient $w_O(i)$ in the field of signal processing. Since the coefficient $w_O(i)$ is a positive value, the coefficient $w_O(i)$ being larger or smaller than a predetermined value could be expressed by the magnitude of the coefficient $w_O(i)$ being larger or smaller than the predetermined value. The magnitude of a lag window $w_O(i)$ means the value of the lag window $w_O(i)$ itself.

The information about the fundamental frequency input to the coefficient determination unit 24 is information that determines the fundamental frequency obtained from all or a part of the input signal of the current frame and/or the input signals of frames near the current frame. That is, the fundamental frequency used to determine the coefficient $w_O(i)$ is the fundamental frequency obtained from all or a part of the input signal of the current frame and/or the input signals of frames near the current frame.

The coefficient determination unit 24 determines, as coefficients $w_O(0)$, $w_O(1)$, . . . , $w_O(P_{max})$ for all or some of the orders from zero to $P_{max}$, values that decrease with an increase in the fundamental frequency corresponding to the information about the fundamental frequency in all or a part of the possible range of the fundamental frequency corresponding to the information about the fundamental frequency. As the coefficients $w_O(0)$, $w_O(1)$, . . . , $w_O(P_{max})$, the coefficient determination unit 24 may also determine values that decrease with an increase in the fundamental frequency by using a value that is positively correlated with the fundamental frequency in place of the fundamental frequency.

The coefficient $w_O(i)$ (i=0, 1, . . . , $P_{max}$) is determined to include the magnitude of the coefficient $w_O(i)$ corresponding to the order i being in a monotonically decreasing relationship with an increase in a value that is positively correlated with the fundamental frequency in the signal segment that includes all or a part of the input signal $X_O(n)$ of the current frame, for at least some of the prediction orders i. In other words, the magnitude of the coefficient $w_O(i)$ for some orders i may not decrease monotonically with an increase in a value that is positively correlated with the fundamental frequency, as described later.

The possible range of the value that is positively correlated with the fundamental frequency may have a range in which the magnitude of the coefficient $w_O(i)$ is constant regardless of an increase in the value that is positively correlated with the fundamental frequency, but in the remaining range, the magnitude of the coefficient $w_O(i)$ should decrease monotonically with an increase in the value that is positively correlated with the fundamental frequency.

The coefficient determination unit 24 determines the coefficient $w_O(i)$ by using a monotonically non-increasing function of the fundamental frequency corresponding to the input information about the fundamental frequency, for example. The coefficient $w_O(i)$ is determined as given by expression (1) below, for example. In the following expression, P is the fundamental frequency corresponding to the input information about the fundamental frequency.

[Formula 6]

$$w_o(i)=\exp\left(-\frac{1}{2}\left(\frac{2\pi Pi}{f_s}\right)^2\right),\ i=0,1,\ \dots\ ,P_{max} \tag{1}$$

Alternatively, the coefficient $w_O(i)$ is determined by expression (2) given below, which uses a predetermined value α larger than 0. When the coefficient $w_O(i)$ is considered as a lag window, the value α is used to adjust the width of the lag window, in other words, the strength of the lag window. The predetermined value α should be determined by encoding and decoding the speech signal or the acoustic signal with an encoder that includes the linear prediction analysis device 2 and a decoder corresponding to the encoder, for a plurality of candidate α values, and selecting such candidate α value that gives suitable subjective quality or objective quality of the decoded speech signal or decoded acoustic signal.

[Formula 7]

$$w_o(i)=\exp\left(-\frac{1}{2}\left(\frac{2\pi\alpha Pi}{f_s}\right)^2\right),\ i=0,1,\ \dots\ ,P_{max} \tag{2}$$

Alternatively, the coefficient $w_O(i)$ may be determined as given by expression (2A) below, which uses a predetermined function f(P) for the fundamental frequency P. The function f(P) expresses a positive correlation with the fundamental frequency P and a monotonically non-decreasing relationship with the fundamental frequency P, such as f(P)=αP+β (α is a positive value, and β is a predetermined value) and $f(P)=\alpha P^2+\beta P+\gamma$ (α is a positive value, and β and γ are predetermined values).

[Formula 8]

$$w_o(i)=\exp\left(-\frac{1}{2}\left(\frac{2\pi f(P)i}{f_s}\right)^2\right),\ i=0,1,\ \dots\ ,P_{max} \tag{2A}$$

The expression which uses the fundamental frequency P to determine the coefficient $w_O(i)$ is not limited to expressions (1), (2), and (2A) given above and can be a different expression that can describe a monotonically non-increasing relationship with respect to an increase in a value that is positively correlated with the fundamental frequency. For example, the coefficient $w_O(i)$ can be determined by any of expressions (3) to (6) given below, where a is a real number dependent on the fundamental frequency, and m is a natural number dependent on the fundamental frequency. For example, a represents a value that is negatively correlated with the fundamental frequency, and m represents a value that is negatively correlated with the fundamental frequency. τ is a sampling period.

[Formula 9]

$$w_o(i)=1-\tau i/a,\ i=0,1,\ \dots\ ,P_{max} \tag{3}$$

$$w_o(i)=\binom{2m}{m-i}\Big/\binom{2m}{m},\ i=0,1,\ \dots\ ,P_{max} \tag{4}$$

$$w_o(i)=\left(\frac{\sin a\tau i}{a\tau i}\right)^2,\ i=0,1,\ \dots\ ,P_{max} \tag{5}$$

$$w_o(i)=\left(\frac{\sin a\tau i}{a\tau i}\right),\ i=0,1,\ \dots\ ,P_{max} \tag{6}$$

Expression (3) is a window function of a type called a Bartlett window, expression (4) is a window function of a type called a Binomial window, expression (5) is a window function of a type called a Triangular in frequency domain window, and expression (6) is a window function of a type called a Rectangular in frequency domain window.

The coefficient $w_O(i)$ for not every i but at least some orders i satisfying $0\approx i\leq P_{max}$ may decrease monotonically with an increase in a value that is positively correlated with the fundamental frequency. In other words, the magnitude of the coefficient $w_O(i)$ for some orders i may not decrease monotonically with an increase in a value that is positively correlated with the fundamental frequency.

For example, when i=0, the value of the coefficient $w_O(0)$ can be determined by using any of expressions (1) to (6) given above or can be an empirically obtained fixed value that does not depend on a value that is positively correlated with the fundamental frequency, such as $w_O(O)=1.0001$ or $w_O(0)=1.003$ used in ITU-T G.718 and the like. That is, the coefficient $w_O(i)$ for each i satisfying $0\leq i\leq P_{max}$ has a value that decreases with an increase in a value that is positively correlated with the fundamental frequency, but the coefficient for i=0 can be a fixed value.

[Coefficient Multiplication Unit 22]

The coefficient multiplication unit 22 obtains a modified autocorrelation $R'_O(i)$ (i=0, 1, . . . , $P_{max}$) by multiplying the coefficient $w_O(i)$ (i 0, 1, . . . , $P_{max}$) determined by the coefficient determination unit 24 by the autocorrelation $R_O(i)$ (i=0, 1, . . . , $P_{max}$), for the same i, obtained by the autocorrelation calculation unit 21 (step S2). That is, the coefficient multiplication unit 22 calculates the autocorrelation $R'_O(i)$ as given by expression (15) below. The calculated autocorrelation $R'_O(i)$ is supplied to the prediction coefficient calculation unit 23.

[Formula 10]

$$R'_O(i)=R_O(i)\times w_O(i) \tag{15}$$

[Prediction Coefficient Calculation Unit 23]

The prediction coefficient calculation unit 23 calculates coefficients that can be transformed to linear prediction coefficients, by using the modified autocorrelation $R'_O(i)$ (step S3).

For example, the prediction coefficient calculation unit 23 calculates first-order to $P_{max}$-order, which is a predetermined maximum order, PARCOR coefficients $K_O(1)$, $K_O(2)$, . . . , $K_O(P_{max})$ or linear prediction coefficients $a_O(1)$, $a_O(2)$, . . . , $a_O(P_{max})$, by using the modified autocorrelation $R'_O(i)$ and the Levinson-Durbin method.

According to the linear prediction analysis device 2 in the first embodiment, by calculating coefficients that can be transformed to linear prediction coefficients by using a modified autocorrelation obtained by multiplying an autocorrelation by a coefficient $w_O(i)$ that includes such a coefficient $w_O(i)$ for each order i of at least some prediction orders i that the magnitude monotonically decreases with an increase in a value that is positively correlated with the fundamental frequency in the signal segment that includes all or a part of the input signal $X_O(n)$ of the current frame, the coefficients that can be transformed to the linear prediction coefficients suppress the generation of a spectral peak caused by a pitch component even when the fundamental frequency of the input signal is high, and the coefficients that can be transformed to the linear prediction coefficients can represent a spectral envelope even when the fundamental frequency of the input signal is low, thereby making it possible to implement linear prediction with a higher analysis accuracy than before. Therefore, the quality of a decoded speech signal or a decoded acoustic signal obtained by encoding and decoding the input speech signal or the input acoustic signal with an encoder that includes the linear prediction analysis device 2 according to the first embodiment and a decoder corresponding to the encoder is better than the quality of a decoded speech signal or a decoded acoustic signal obtained by encoding and decoding the input speech signal or the input acoustic signal with an encoder that includes a conventional linear prediction analysis device and a decoder corresponding to the encoder.

Modification of First Embodiment

In a modification of the first embodiment, the coefficient determination unit 24 determines the coefficient $w_O(i)$ on the basis of a value that is negatively correlated with the fundamental frequency, instead of a value that is positively correlated with the fundamental frequency. The value that is negatively correlated with the fundamental frequency is, for example, a period, an estimated value of the period, or a quantized value of the period. Given that the period is T, the fundamental frequency is P, and the sampling frequency is $f_s$, $T=f_s/P$, so that the period is negatively correlated with the fundamental frequency. An example of determining the coefficient $w_O(i)$ on the basis of a value that is negatively correlated with the fundamental frequency will be described as a modification of the first embodiment.

The functional configuration of the linear prediction analysis device 2 in the modification of the first embodiment and the flowchart of the linear prediction analysis method of the linear prediction analysis device 2 are the same as those in the first embodiment, which are shown in FIGS. 1 and 2. The linear prediction analysis device 2 in the modification of the first embodiment is the same as the linear prediction analysis device 2 in the first embodiment, except for the processing in the coefficient determination unit 24. Information about the period of the digital speech signal or the digital acoustic signal of respective frames is also input to the linear prediction analysis device 2. The information about the period is obtained by the periodicity analysis unit 900 disposed outside the linear prediction analysis device 2. The periodicity analysis unit 900 includes a period calculation unit 940, for example.

[Period Calculation Unit 940]

The period calculation unit 940 calculates the period T from all or a part of the input signal $X_O$ of the current frame and/or the input signals of frames near the current frame. The period calculation unit 940 calculates the period T of the digital speech signal or the digital acoustic signal in the signal segment that includes all or a part of the input signal $X_O(n)$ of the current frame, for example, and outputs information that can determine the period T, as the information about the period. There are a variety of known methods of obtaining the period, and any of those known methods can be used. A period code may be obtained by encoding the calculated period T, and the period code may be output as the information about the period. A quantized value $\hat{T}$ of the period corresponding to the period code may also be obtained, and the quantized value $\hat{T}$ of the period may be output as the information about the period. Specific examples of the period calculation unit 940 will be described next.

Specific Example 1 of Period Calculation Unit 940

In specific example 1 of the period calculation unit 940, the input signal $X_O(n)$ ($n=0, 1, \ldots, N-1$) of the current frame is constituted of a plurality of subframes, and, for each frame, the period calculation unit 940 begins its operation earlier than the linear prediction analysis device 2. The period calculation unit 940 first calculates respective periods $T_{s1}, \ldots, T_{sM}$ of M subframes $X_{Os1}(n)$ ($n=0, 1, \ldots, N/M-1$), $\ldots$, $X_{OsM}(n)$ ($n=(M-1)N/M, (M-1)N/M+1, \ldots, N-1$), where M is an integer not smaller than 2. It is assumed that N is divisible by M. The period calculation unit 940 outputs information that can determine the minimum value $\min(T_{s1}, \ldots, T_{sM})$ of the periods $T_{s1}, \ldots, T_{sM}$ of the M subframes constituting the current frame, as the information about the period.

Specific Example 2 of Period Calculation Unit 940

In specific example 2 of the period calculation unit 940, with the input signal $X_O(n)$ ($n=0, 1, \ldots, N-1$) of the current frame and a part of the input signal $X_O(n)$ ($n=N, N+1, \ldots, N+Nn-1$) of the next frame (Nn is a predetermined positive integer which satisfies the relationship $Nn<N$), the signal segment including the look-ahead portion is configured as the signal segment of the current frame, and, for each frame, the period calculation unit 940 begins its operation later than the linear prediction analysis device 2. The period calculation unit 940 calculates the periods $T_{now}$ and $T_{next}$ of the input signal $X_O(n)$ ($n=0, 1, \ldots, N-1$) of the current frame and a part of the input signal $X_O(n)$ ($n=N, N+1, \ldots, N+Nn-1$) of the next frame, respectively, in the signal segment of the current frame and stores the period $T_{next}$ in the period calculation unit 940. As the information about the period, the period calculation unit 940 outputs information that can determine the period $T_{next}$ which has been obtained in the signal segment of the preceding frame and stored in the period calculation unit 940, that is, the period obtained for the part of the input signal $X_O(n)$ ($n=0, 1, \ldots, Nn-1$) of the current frame in the signal segment of the preceding frame. The period of each subframe in a plurality of subframes of the current frame may be obtained as in specific example 1.

Specific Example 3 of Period Calculation Unit 940

In specific example 3 of the period calculation unit 940, the input signal $X_O(n)$ ($n=0, 1, \ldots, N-1$) of the current frame itself forms the signal segment of the current frame, and, for each frame, the period calculation unit 940 begins its operation later than the linear prediction analysis device 2. The period calculation unit 940 calculates the period T of the input signal $X_O(n)$ ($n=0, 1, \ldots, N-1$) of the current frame, which forms the signal segment of the current frame, and stores the period T in the period calculation unit 940. As the information about the period, the period calculation unit 940 outputs information that can determine the period T which has been calculated in the signal segment of the preceding frame, that is, calculated for the input signal $X_O(n)$ ($n=-N, -N+1, \ldots, -1$) of the preceding frame, and stored in the period calculation unit 940.

Processing in the coefficient determination unit 24, by which the operation of the linear prediction analysis device 2 in the modification of the first embodiment differs from the linear prediction analysis device 2 in the first embodiment, will be described next.

[Coefficient Determination Unit 24 in Modification]

The coefficient determination unit 24 of the linear prediction analysis device 2 in the modification of the first embodiment determines the coefficient $w_O(i)$ ($i=0, 1, \ldots, P_{max}$) by using the input information about the period (step S4).

The information about the period input to the coefficient determination unit 24 is information that determines the period calculated from all or a part of the input signal of the current frame and/or the input signals of frames near the current frame. That is, the period that is used to determine the coefficient $w_O(i)$ is the period calculated from all or a part of the input signal of the current frame and/or the input signals of frames near the current frame.

The coefficient determination unit 24 determines, as coefficients $w_O(0)$, $w_O(1)$, . . . , $w_O(P_{max})$ for all or some of the orders from 0 to $P_{max}$, values that increase with an increase in the period corresponding to the information about the period in all or a part of the possible range of the period corresponding to the information about the period. The coefficient determination unit 24 may also determine values that increase with an increase in the period, as the coefficients $w_O(0)$, $w_O(1)$, . . . , $w_O(P_{max})$ by using a value that is positively correlated with the period, instead of the period itself.

The coefficient $w_O(i)$ ($i=0, 1, \ldots, P_{max}$) is determined to include the magnitude of the coefficient $w_O(i)$ corresponding to the order i being in a monotonically increasing relationship with an increase in a value that is negatively correlated with the fundamental frequency in the signal segment that includes all or a part of the input signal $X_O(n)$ of the current frame, for at least some of the prediction orders i.

In other words, the magnitude of the coefficient $w_O(i)$, for some orders i, may not increase monotonically with an increase in a value that is negatively correlated with the fundamental frequency.

The possible range of the value that is negatively correlated with the fundamental frequency may have a range in which the magnitude of the coefficient $w_O(i)$ is constant regardless of an increase in the value that is negatively correlated with the fundamental frequency, but in the remaining range, the magnitude of the coefficient $w_O(i)$ should increase monotonically with an increase in the value that is negatively correlated with the fundamental frequency.

The coefficient determination unit 24 determines the coefficient $w_O(i)$ by using a monotonically non-decreasing function of the period corresponding to the input information about the period, for example. The coefficient $w_O(i)$ is determined as given by expression (7) below, for example. In the following expression, T is the period corresponding to the input information about the period.

[Formula 11]

$$w_o(i) = \exp\left(-\frac{1}{2}\left(\frac{2\pi i}{T}\right)^2\right),\ i = 0,1,2, \ldots, P_{max} \tag{7}$$

Alternatively, the coefficient $w_O(i)$ is determined as given by expression (8) below, which uses a predetermined value α larger than 0. When the coefficient $w_O(i)$ is considered as a lag window, the value α is used to adjust the width of the lag window, in other words, the strength of the lag window. The predetermined value α should be determined by encoding and decoding the speech signal or the acoustic signal with an encoder that includes the linear prediction analysis device 2 and a decoder corresponding to the encoder, for a plurality of candidate α values, and selecting such candidate α value that gives suitable subjective quality or objective quality of the decoded speech signal or the decoded acoustic signal.

[Formula 12]

$$w_o(i) = \exp\left(-\frac{1}{2}\left(\frac{2\pi i}{\alpha T}\right)^2\right),\ i = 0,1,2, \ldots, P_{max} \tag{8}$$

Alternatively, the coefficient $w_O(i)$ is determined as given by expression (8A) below, which uses a predetermined function f(T) for the period T. The function f(T) expresses a positive correlation with the period T and a monotonically non-decreasing relationship with the period T, such as $f(T)=\alpha T+\beta$ (α is a positive value, and β is a predetermined value) and $f(T)=\alpha T^2+\beta T+\gamma$ (α is a positive value, and β and γ are predetermined values).

[Formula 13]

$$w_o(i) = \exp\left(-\frac{1}{2}\left(\frac{2\pi i}{f(T)}\right)^2\right),\ i = 0,1,2, \ldots, P_{max} \tag{8A}$$

The expression that uses the period T to determine the coefficient $w_O(i)$ is not limited to expressions (7), (8), and (8A) given above and may be a different expression that can describe a monotonically non-decreasing relationship with an increase in a value that is negatively correlated with the fundamental frequency.

The coefficient $w_O(i)$ may increase monotonically with an increase in a value that is negatively correlated with the fundamental frequency, not for every i satisfying $0 \le i \le P_{max}$, but at least for some orders i. In other words, the magnitude of the coefficient $w_O(i)$ for some orders i may not increase monotonically with an increase in a value that is negatively correlated with the fundamental frequency.

For example, when i=0, the value of the coefficient $w_O(0)$ may be determined by using expression (7), (8), or (8A) given above or may be an empirically obtained fixed value that does not depend on a value that is negatively correlated with the fundamental frequency, such as $w_O(0)=1.0001$ or $w_O(0)=1.003$ used in ITU-T G.718 and the like. That is, the coefficient $w_O(i)$ for each i satisfying $0 \le i \le P_{max}$ has a value that increases with an increase in a value that is negatively correlated with the fundamental frequency, but the coefficient for i=0 may be a fixed value.

According to the linear prediction analysis device 2 in the modification of the first embodiment, by calculating coefficients that can be transformed to linear prediction coefficients, by using a modified autocorrelation obtained by multiplying an autocorrelation by a coefficient $w_O(i)$ that includes such a coefficient $w_O(i)$ for order i of at least some prediction orders i that the magnitude is monotonically increases with an increase in a value that is negatively correlated with the fundamental frequency in the signal segment that includes all or a part of the input signal $X_O(n)$ of the current frame, the coefficients that can be transformed to the linear prediction coefficients suppress the generation of a spectral peak caused by a pitch component even when the fundamental frequency of the input signal is high, and the coefficients that can be transformed to the linear prediction coefficients can represent a spectral envelope even when the fundamental frequency of the input signal is low, thereby making it possible to implement linear prediction with a higher analysis accuracy than before. Therefore, the quality of a decoded speech signal or a decoded acoustic signal obtained by encoding and decoding the input speech signal or the input acoustic signal with an encoder that includes the linear prediction analysis device 2 in the modification of the first embodiment and a decoder corresponding to the encoder is better than the quality of a decoded speech signal or a decoded acoustic signal obtained by encoding and decoding the input speech signal or the input acoustic signal with an encoder that includes a conventional linear prediction analysis device and a decoder corresponding to the encoder.

Experimental Results

Figure 9:
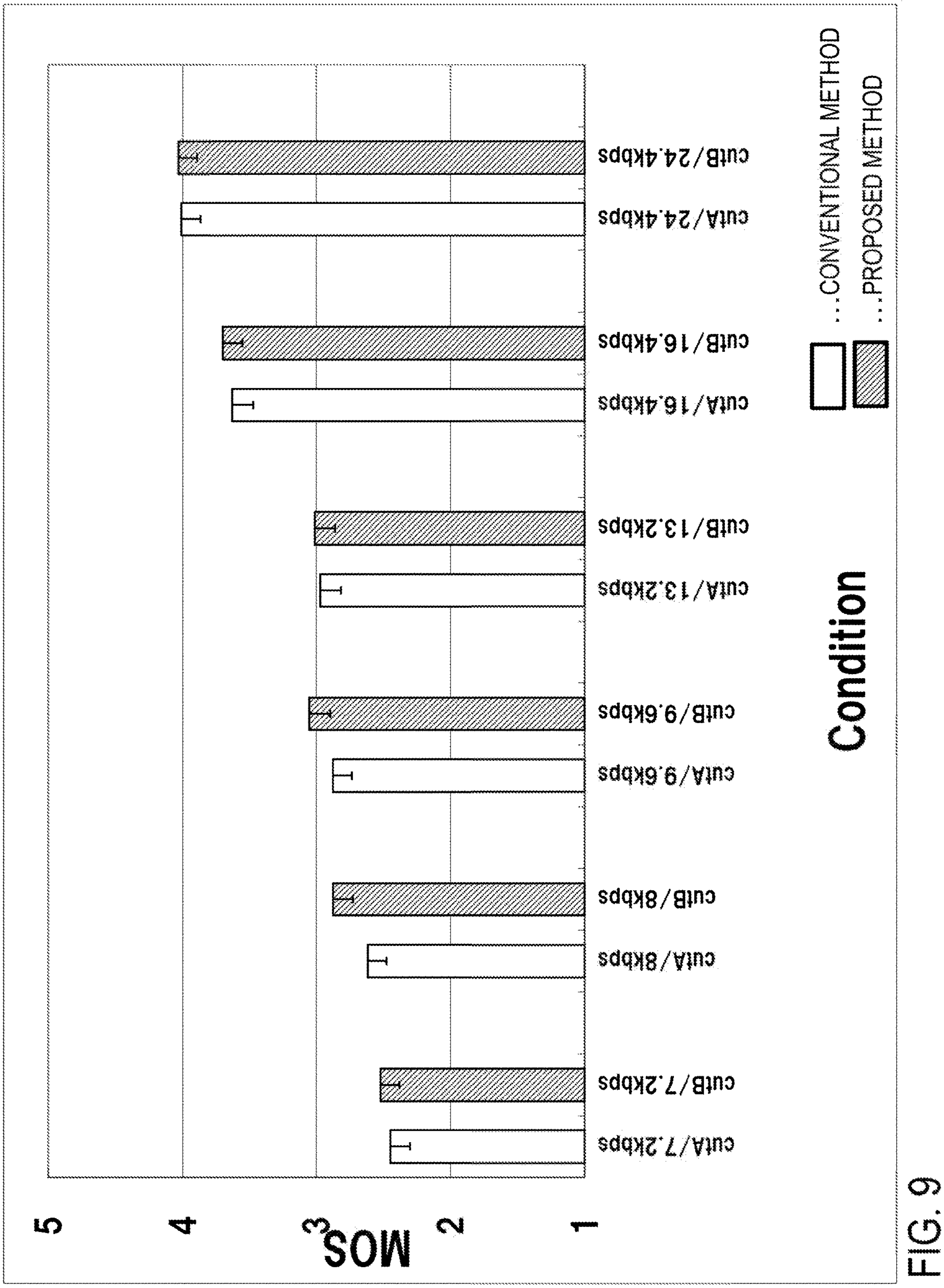
FIG. 9 is a view showing an example of experimental results.

FIG. 9 shows experimental results of a MOS evaluation experiment with 24 speech/acoustic signal sources and 24 test subjects. Six cutA MOS values of the conventional method in FIG. 9 are MOS values for decoded speech signals or decoded acoustic signals obtained by encoding and decoding source speech or acoustic signals by using encoders that include the conventional linear prediction analysis device and having respective bit rates shown in FIG. 9 and decoders corresponding to the encoders. Six cutB MOS values of the proposed method in FIG. 9 are MOS values for decoded speech signals or decoded acoustic signals obtained by encoding and decoding source speech or acoustic signals by using encoders that include the linear prediction analysis device of the modification of the first embodiment and having respective bit rates shown in FIG. 9 and decoders corresponding to the encoders. The experimental results in FIG. 9 indicate that by using an encoder that includes the linear prediction analysis device of the present invention and a decoder corresponding to the encoder, higher MOS values, that is, higher sound quality, are obtained than when the conventional linear prediction analysis device is included.

Second Embodiment

In a second embodiment, a value that is positively correlated with the fundamental frequency or a value that is negatively correlated with the fundamental frequency is compared with a predetermined threshold, and the coefficient $w_O(i)$ is determined in accordance with the result of the comparison. The second embodiment differs from the first embodiment only in the method of determining the coefficient $w_O(i)$ in the coefficient determination unit 24, and is the same as the first embodiment in the other respects. The difference from the first embodiment will be described mainly, and a description of the same parts as in the first embodiment will be omitted.

A case in which a value that is positively correlated with the fundamental frequency is compared with a predetermined threshold and the coefficient $w_O(i)$ is determined in accordance with the result of the comparison will be described below. A case in which a value that is negatively correlated with the fundamental frequency is compared with a predetermined threshold and the coefficient $w_O(i)$ is determined in accordance with the result of the comparison will be described in a first modification of the second embodiment.

The functional configuration of the linear prediction analysis device 2 in the second embodiment and the flowchart of the linear prediction analysis method by the linear prediction analysis device 2 are the same as those in the first embodiment, shown in FIGS. 1 and 2. The linear prediction analysis device 2 in the second embodiment is the same as the linear prediction analysis device 2 in the first embodiment, except for the processing in the coefficient determination unit 24.

Figure 3:
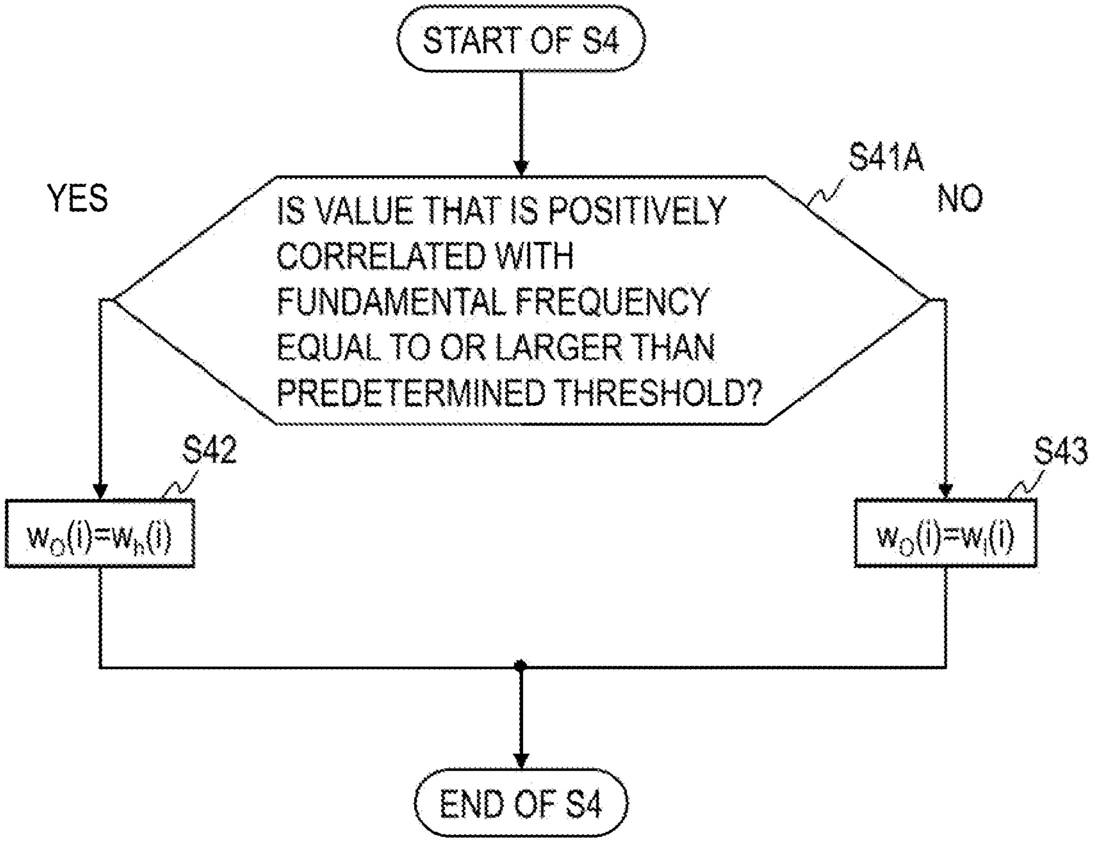
FIG. 3 is a flowchart illustrating an example of a linear prediction analysis method according to the second embodiment.

An example flow of processing in the coefficient determination unit 24 in the second embodiment is shown in FIG. 3. The coefficient determination unit 24 in the second embodiment performs step S41A, step S42, and step S43 in FIG. 3, for example.

The coefficient determination unit 24 compares a value that is positively correlated with the fundamental frequency corresponding to the input information about the fundamental frequency, with a predetermined threshold (step S41A). The value that is positively correlated with the fundamental frequency corresponding to the input information about the fundamental frequency is, for example, the fundamental frequency itself corresponding to the input information about the fundamental frequency.

When the value that is positively correlated with the fundamental frequency is equal to or larger than the predetermined threshold, that is, when the fundamental frequency is judged to be high, the coefficient determination unit 24 determines the coefficient $w_h(i)$ in accordance with a predetermined rule and sets the determined coefficient $w_h(i)$ ($i=0, 1, \ldots, P_{max}$) as $w_O(i)$ ($i=0, 1, \ldots, P_{max}$) (step S42), that is, $w_O(i)=w_h(i)$.

When the value that is positively correlated with the fundamental frequency is smaller than the predetermined threshold, that is, when the fundamental frequency is judged to be low, the coefficient determination unit 24 determines the coefficient $w_l(i)$ in accordance with a predetermined rule and sets the determined coefficient $w_l(i)$ ($i=0, 1, \ldots, P_{max}$) as $w_O(i)$ ($i=0, 1, \ldots, P_{max}$) (step S43), that is, $w_O(i)=w_l(i)$.

Here, $w_h(i)$ and $w_l(i)$ are determined to satisfy the relationship $w_h(i)<w_l(i)$ for some orders i at least. Alternatively, $w_h(i)$ and $w_l(i)$ are determined to satisfy the relationship $w_h(i)<w_l(i)$ for some orders i at least and to satisfy the relationship $w_h(i)$ $w_l(i)$ for the other orders i. Some orders i at least here mean orders i other than 0 (that is, $1 \le i \le P_{max}$). For example, $w_h(i)$ and $w_l(i)$ are determined in accordance with such a predetermined rule that $w_O(i)$ for the case where the fundamental frequency P is P1 in expression (1) is obtained as $w_h(i)$, and $w_O(i)$ for the case where the fundamental frequency P is P2 (P1>P2) in expression (1) is obtained as $w_l(i)$. Alternatively, for example, $w_h(i)$ and $w_l(i)$ are determined in accordance with such a predetermined rule that $w_O(i)$ for the case where $\alpha$ is $\alpha 1$ in expression (2) is obtained as $w_h(i)$, and $w_O(i)$ for the case where $\alpha$ is $\alpha$2 ($\alpha$1>$\alpha$2) in expression (2) is obtained as $w_l(i)$. In that case, like $\alpha$ in expression (2), $\alpha$1 and $\alpha$2 are both determined beforehand. $w_h(i)$ and $w_l(i)$ obtained beforehand in accordance with either of the above rules may be stored in a table, and either $w_h(i)$ or $w_l(i)$ may be selected from the table, depending on whether the value that is positively correlated with the fundamental frequency is not smaller than a predetermined threshold. $w_h(i)$ and $w_l(i)$ are determined in such a manner that the values of $w_h(i)$ and $w_l(i)$ decrease as i increases. Here, $w_h(0)$ and $w_l(0)$ for i=0 are not required to satisfy the relationship $w_h(0) \le w_l(0)$, and values satisfying the relationship $w_h(0)>w_l(0)$ may be used.

Also in the second embodiment, as in the first embodiment, coefficients that can be transformed to linear prediction coefficients that suppress the generation of a spectral peak caused by a pitch component can be obtained even when the fundamental frequency of the input signal is high, and coefficients that can be transformed to linear prediction coefficients that can express a spectral envelope can be obtained even when the fundamental frequency of the input signal is low, thereby making it possible to implement linear prediction with a higher analysis accuracy than before.

First Modification of Second Embodiment

In a first modification of the second embodiment, a predetermined threshold is compared not with a value that is positively correlated with the fundamental frequency but with a value that is negatively correlated with the fundamental frequency, and the coefficient $w_O(i)$ is determined in accordance with the result of the comparison. The predetermined threshold in the first modification of the second embodiment differs from the predetermined threshold compared with a value that is positively correlated with the fundamental frequency in the second embodiment.

The functional configuration and flowchart of the linear prediction analysis device 2 in the first modification of the second embodiment are the same as those in the modification of the first embodiment, as shown in FIGS. 1 and 2. The linear prediction analysis device 2 in the first modification of the second embodiment is the same as the linear prediction analysis device 2 in the modification of the first embodiment, except for processing in the coefficient determination unit 24.

Figure 4:
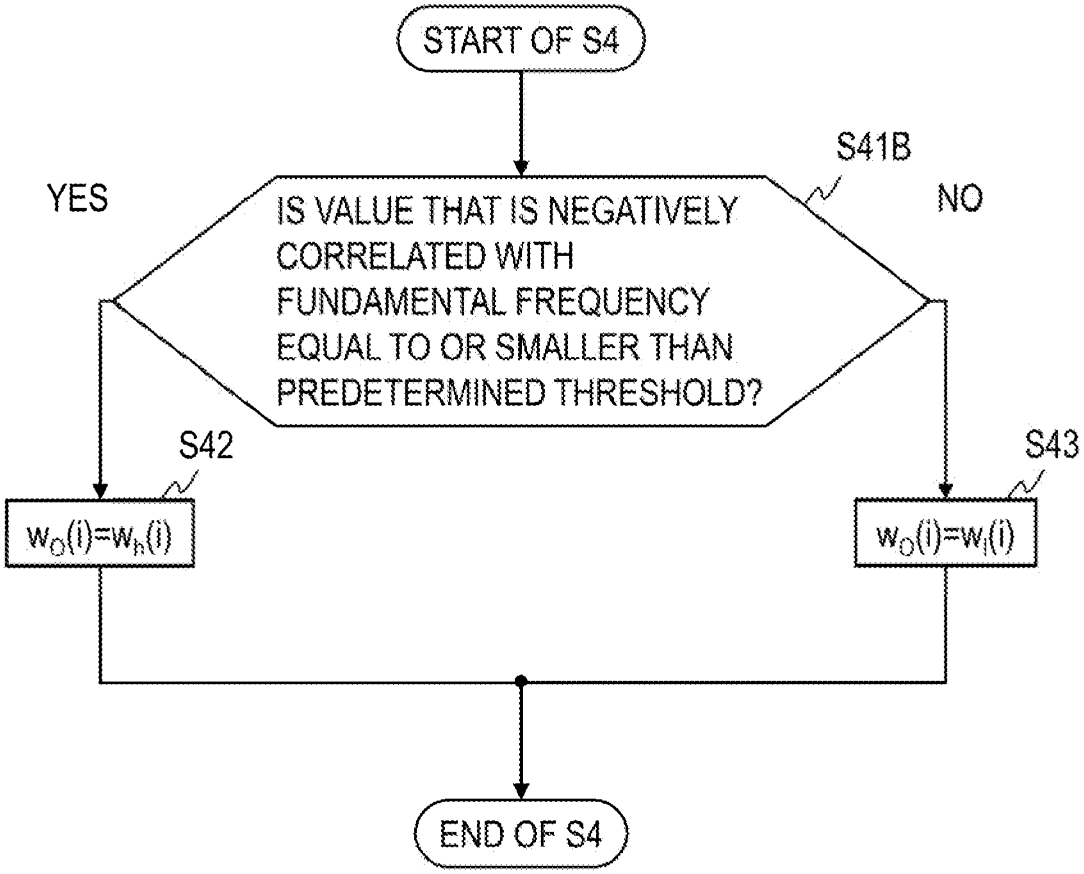
FIG. 4 is a flowchart illustrating an example of the linear prediction analysis method according to the second embodiment.

An example flow of processing in the coefficient determination unit 24 in the first modification of the second embodiment is shown in FIG. 4. The coefficient determination unit 24 in the first modification of the second embodiment performs step S41B, step S42, and step S43 in FIG. 4, for example.

The coefficient determination unit 24 compares a value that is negatively correlated with the fundamental frequency corresponding to the input information about the period, with a predetermined threshold (step S41B). The value that is negatively correlated with the fundamental frequency corresponding to the input information about the period is, for example, the period corresponding to the input information about the period.

When the value that is negatively correlated with the fundamental frequency is equal to or smaller than the predetermined threshold, that is, when the period is judged to be short, the coefficient determination unit 24 determines the coefficient $w_h(i)$ $(i=0, 1, \ldots, P_{max})$ in accordance with a predetermined rule and sets the determined coefficient $w_h(i)(i=0, 1, \ldots, P_{max})$ as $w_O(i)$ $(i=0, 1, \ldots, P_{max})$ (step S42), that is, $w_O(i)=w_h(i)$.

When the value that is negatively correlated with the fundamental frequency is larger than the predetermined threshold, that is, when the period is judged to be long, the coefficient determination unit 24 determines the coefficient $w_l(i)(i=0, 1, \ldots, P_{max})$ in accordance with a predetermined rule and sets the determined coefficient $w_l(i)$ as $w_O(i)$ (step S43), that is, $w_O(i)=w_l(i)$.

Here, $w_h(i)$ and $w_l(i)$ are determined to satisfy the relationship $w_h(i)<w_l(i)$ for some orders i at least. Alternatively, $w_h(i)$ and $w_l(i)$ are determined to satisfy the relationship $w_h(i)<w_l(i)$ for some orders i at least and to satisfy the relationship $w_h(i)$ $w_l(i)$ for the other orders i. Some orders i at least here mean orders i other than 0 (that is, $1 \leq i \leq P_{max}$). For example, $w_h(i)$ and $w_l(i)$ are determined in accordance with such a predetermined rule that $w_O(i)$ for the case where the period T is T1 in expression (7) is obtained as $w_h(i)$, and $w_O(i)$ for the case where the period T is T2 (T1<T2) in expression (7) is obtained as $w_l(i)$. Alternatively, for example, $w_h(i)$ and $w_l(i)$ are determined in accordance with such a predetermined rule that $w_O(i)$ for the case where $\alpha$ is $\alpha$1 in expression (8) is obtained as $w_h(i)$, and $w_O(i)$ for the case where $\alpha$ is $\alpha$2 ($\alpha$1<$\alpha$2) in expression (8) is obtained as $w_l(i)$. In that case, like $\alpha$ in expression (8), $\alpha$1 and $\alpha$2 are both determined beforehand. $w_h(i)$ and $w_l(i)$ obtained beforehand in accordance with either of the above rules may be stored in a table, and either $W_h(i)$ or $w_l(i)$ may be selected from the table, depending on whether the value that is negatively correlated with the fundamental frequency is not larger than a predetermined threshold. $w_h(i)$ and $w_l(i)$ are determined in such a manner that the values of $w_h(i)$ and $w_l(i)$ decrease as i increases. Here, $w_h(0)$ and $w_l(0)$ for i=0 are not required to satisfy the relationship $w_h(0)$ S $w_l(0)$, and values satisfying the relationship $w_h(0)>w_l(0)$ may be used.

Also in the first modification of the second embodiment, as in the modification of the first embodiment, coefficients that can be transformed to linear prediction coefficients that suppress the generation of a spectral peak caused by a pitch component can be obtained even when the fundamental frequency of the input signal is high, and coefficients that can be transformed to linear prediction coefficients that can express a spectral envelope can be obtained even when the fundamental frequency of the input signal is low, thereby making it possible to implement linear prediction with a higher analysis accuracy than before.

Second Modification of Second Embodiment

A single threshold is used to determine the coefficient $w_O(i)$ in the second embodiment. Two or more thresholds are used to determine the coefficient $w_O(i)$ in a second modification of the second embodiment. A method of determining the coefficient by using two thresholds th1' and th2' will be described next. The thresholds th1' and th2' satisfy the relationship 0<th1'<th2'.

The functional configuration of the linear prediction analysis device 2 in the second modification of the second embodiment is the same as that in the second embodiment, shown in FIG. 1. The linear prediction analysis device 2 in the second modification of the second embodiment is the same as the linear prediction analysis device 2 in the second embodiment, except for processing in the coefficient determination unit 24.

The coefficient determination unit 24 compares a value that is positively correlated with the fundamental frequency corresponding to the input information about the fundamental frequency, with the thresholds th1' and th2'. The value that is positively correlated with the fundamental frequency corresponding to the input information about the fundamental frequency is, for example, the fundamental frequency itself corresponding to the input information about the fundamental frequency.

When the value that is positively correlated with the fundamental frequency is larger than the threshold th2', that is, when the fundamental frequency is judged to be high, the coefficient determination unit 24 determines the coefficient $w_h(i)$ $(i=0, 1, \ldots, P_{max})$ in accordance with a predetermined rule and sets the determined coefficient $w_h(i)$ $(i=0, 1, \ldots, P_{max})$ as $w_O(i)$ $(i=0, 1, \ldots, P_{max})$, that is, $w_O(i)=w_h(i)$.

When the value that is positively correlated with the fundamental frequency is larger than the threshold th1' and is equal to or smaller than the threshold th2', that is, when the fundamental frequency is judged to be intermediate, the coefficient determination unit 24 determines the coefficient $w_m(i)$ $(i=0, 1, \ldots, P_{max})$ in accordance with a predetermined rule and sets the determined coefficient $w_m(i)$ $(i=0, 1, \ldots, P_{max})$ as $w_O(i)$ $(i=0, 1, \ldots, P_{max})$, that is, $w_O(i)=w_m(i)$.

When the value that is positively correlated with the fundamental frequency is equal to or smaller than the threshold th1', that is, when the fundamental frequency is judged to be low, the coefficient determination unit 24 determines the coefficient $w_l(i)$ $(i=0, 1, \ldots, P_{max})$ in accordance with a predetermined rule and sets the determined coefficient $w_l(i)$ $(i=0, 1, \ldots, P_{max}$ as $w_O(i)$ $(i=0, 1, \ldots, P_{max})$, that is, $w_O(i)=w_l(i)$.

Here, $w_h(i)$, $w_m(i)$, and $w_l(i)$ are determined to satisfy the relationship $w_h(i)<w_m(i)<w_l(i)$ for some orders i at least. Some orders i at least here mean orders i other than 0 (that is, $\mathbf{1}\le i\le P_{max}$), for example. Alternatively, $w_h(i)$, $w_m(i)$, and $w_l(i)$ are determined to satisfy the relationship $w_h(i)<w_m(i)\le w_l(i)$ for some orders i at least, the relationship $w_h(i)\le w_m(i)<w_l(i)$ for some orders i of the other orders i, and the relationship $w_h(i)\le w_m(i)\le w_l(i)$ for some orders i of the remaining orders i. For example, $w_h(i)$, $w_m(i)$, and $w_l(i)$ are determined in accordance with such a predetermined rule that $w_O(i)$ for the case where the fundamental frequency P is P1 in expression (1) is obtained as $w_h(i)$, $w_O(i)$ for the case where the fundamental frequency P is P2 (P1>P2) in expression (1) is obtained as $w_m(i)$, and $w_O(i)$ for the case where the fundamental frequency P is P3 (P2>P3) in expression (1) is obtained as $w_l(i)$. Alternatively, for example, $w_h(i)$, $w_m(i)$, and $w_l(i)$ are determined in accordance with such a predetermined rule that $w_O(i)$ for the case where $\alpha$ is $\alpha$1 in expression (2) is obtained as $w_h(i)$, $w_O(i)$ for the case where $\alpha$ is $\alpha$2 ($\alpha$1>$\alpha$2) in expression (2) is obtained as $w_m(i)$, and $w_O(i)$ for the case where $\alpha$ is $\alpha$3 ($\alpha$2>$\alpha$3) in expression (2) is obtained as $w_l(i)$. In that case, like $\alpha$ in expression (2), $\alpha$1, $\alpha$2, and $\alpha$3 are determined beforehand. $w_h(i)$, $w_m(i)$, and $w_l(i)$ obtained beforehand in accordance with either of the above rules may be stored in a table, and one of $w_h(i)$, $w_m(i)$, and $w_l(i)$ may be selected from the table, depending on the result of comparison between the value that is positively correlated with the fundamental frequency and a predetermined threshold. The intermediate coefficient $w_m(i)$ may also be determined by using $w_h(i)$ and $w_l(i)$. That is, $w_m(i)$ may be determined by $w_m(i)=\beta'\alpha w_h(i)+(1-\beta')\times w_l(i)$. Here, $\beta'$ satisfies $0\le\beta'\le 1$, and is obtained from the fundamental frequency P by a function $\beta'=c(P)$ in which the value of $\beta'$ decreases with a decrease in the fundamental frequency P, and the value of $\beta'$ increases with an increase in the fundamental frequency P. When $w_m(i)$ is obtained in this manner, if the coefficient determination unit 24 stores just two tables, one for storing $w_h(i)$ ($i=0, 1, \ldots, P_{max}$) and the other for storing $w_l(i)$ ($i=0, 1, \ldots, P_{max}$), a coefficient close to $w_h(i)$ can be obtained when the fundamental frequency is high in the midrange of the fundamental frequency, and a coefficient close to $w_l(i)$ can be obtained when the fundamental frequency is low in the midrange of the fundamental frequency. $w_h(i)$, $w_m(i)$, and $w_l(i)$ are determined in such a manner that the values of $w_h(i)$, $w_m(i)$, and $w_l(i)$ decrease as i increases. The coefficients $w_h(0)$, $w_m(0)$, and $w_l(0)$ for $i=0$ are not required to satisfy the relationship $w_h(0)\le w_m(0)\le w_l(0)$, and values satisfying the relationship $w_h(0)>w_m(0)$ and/or $w_m(0)>w_l(0)$ may be used.

Also in the second modification of the second embodiment, as in the second embodiment, coefficients that can be transformed to linear prediction coefficients that suppress the generation of a spectral peak caused by a pitch component can be obtained even when the fundamental frequency of the input signal is high, and coefficients that can be transformed to linear prediction coefficients that can express a spectral envelope can be obtained even when the fundamental frequency of the input signal is low, thereby making it possible to implement linear prediction with a higher analysis accuracy than before.

Third Modification of Second Embodiment

A single threshold is used to determine the coefficient $w_O(i)$ in the first modification of the second embodiment. Two or more thresholds are used to determine the coefficient $w_O(i)$ in a third modification of the second embodiment. A method of determining the coefficient by using two thresholds th1 and th2 will be described next with examples. The thresholds th1 and th2 satisfy the relationship 0<th1<th2.

The functional configuration of the linear prediction analysis device 2 in the third modification of the second embodiment is the same as that in the first modification of the second embodiment, shown in FIG. 1. The linear prediction analysis device 2 in the third modification of the second embodiment is the same as the linear prediction analysis device 2 in the first modification of the second embodiment, except for processing in the coefficient determination unit 24.

The coefficient determination unit 24 compares a value that is negatively correlated with the fundamental frequency corresponding to the input information about the period, with the thresholds th1 and th2. The value that is negatively correlated with the fundamental frequency corresponding to the input information about the period is, for example, the period corresponding to the input information about the period.

When the value that is negatively correlated with the fundamental frequency is smaller than the threshold th1, that is, when the period is judged to be short, the coefficient determination unit 24 determines the coefficient $w_h(i)$ ($i=0, 1, \ldots, P_{max}$) in accordance with a predetermined rule and sets the determined coefficient $w_h(i)$ ($i=0, 1, \ldots, P_{max}$) as $w_O(i)$ ($i=0, 1, \ldots, P_{max}$), that is, $w_O(i)=w_h(i)$.

When the value that is negatively correlated with the fundamental frequency is equal to or larger than the threshold th1 and is smaller than the threshold th2, that is, when the period is judged to be intermediate, the coefficient determination unit 24 determines the coefficient $w_m(i)$ ($i=0, 1, \ldots, P_{max}$) in accordance with a predetermined rule and sets the determined coefficient $w_m(i)$ ($i=0, 1, \ldots, P_{max}$) as $w_O(i)$ ($i=0, 1, \ldots, P_{max}$), that is, $w_O(i)\ w_m(i)$.

When the value that is negatively correlated with the fundamental frequency is equal to or larger than the threshold th2, that is, when the period is judged to be long, the coefficient determination unit 24 determines the coefficient $w_l(i)$ in accordance with a predetermined rule and sets the determined coefficient $w_l(i)$ ($i=0, 1, \ldots, P_{max}$) as $w_O(i)$ ($i=0, 1, \ldots, P_{max}$), that is, $w_O(i)=w_l(i)$.

Here, $w_h(i)$, $w_m(i)$, and $w_l(i)$ are determined to satisfy the relationship $w_h(i)<w_m(i)<w_l(i)$ for some orders i at least. Some orders i at least here mean orders i other than 0 (that is, $1\le i\le P_{max}$), for example. Alternatively, $w_h(i)$, $w_m(i)$, and $w_l(i)$ are determined to satisfy the relationship $w_h(i)<w_m(i)\le w_l(i)$ for some orders i at least, the relationship $w_h(i)\le w_m(i)<w_l(i)$ for some orders i of the other orders i, and the relationship $w_h(i)\le w_m(i)\le w_l(i)$ for the remaining orders i. For example, $w_h(i)$, $w_m(i)$, and $w_l(i)$ are determined in accordance with such a predetermined rule that $w_O(i)$ for the case where the period T is T1 in expression (7) is obtained as $w_h(i)$, $w_O(i)$ for the case where the period T is T2 (T1<T2) in expression (7) is obtained as $w_m(i)$, and $w_O(i)$ for the case where the period T is T3 (T2<T3) in expression (7) is obtained as $w_l(i)$. Alternatively, for example, $w_h(i)$, $w_m(i)$, and $w_l(i)$ are determined in accordance with such a predetermined rule that $w_O(i)$ for the case where $\alpha$ is $\alpha$1 in expression (8) is obtained as $w_h(i)$, $w_O(i)$ for the case where $\alpha$ is $\alpha$2 ($\alpha$1<$\alpha$2) in expression (8) is obtained as $w_m(i)$, and $w_O(i)$ for the case where $\alpha$ is $\alpha$3 ($\alpha$2<$\alpha$3) in expression (2) is obtained as $w_l(i)$. In that case, like $\alpha$ in expression (8), $\alpha$1, $\alpha$2, and $\alpha$3 are determined beforehand. $w_h(i)$, $w_m(i)$, and $w_l(i)$ obtained beforehand in accordance with either of the above rules may be stored in a table, and $w_h(i)$, $w_m(i)$, or $w_l(i)$ may be selected from the table, depending on the result of comparison between the value that is negatively correlated with the fundamental frequency and a predetermined threshold. The intermediate coefficient $w_m(i)$ may also be determined by using $w_h(i)$ and $w_l(i)$. That is, $w_m(i)$ may be determined by $w_m(i)=(1-\beta)\times w_h(i)+\beta\times w_l(i)$. Here, β satisfies $0\leq\beta\leq 1$, and is obtained from the period T by a function $\beta=b(T)$ in which the value of β decreases with a decrease in the period T, and the value of β increases with an increase in the period T. When $w_m(i)$ is obtained in this manner, if the coefficient determination unit 24 stores just two tables, one for storing $w_h(i)$ ($i=0, 1, \ldots, P_{max}$) and the other for storing $w_l(i)$ ($i=0, 1, \ldots, P_{max}$), a coefficient close to $w_h(i)$ can be obtained when the period is short in the midrange of the period, and a coefficient close to $w_l(i)$ can be obtained when the period is long in the midrange of the period. $w_h(i)$, $w_m(i)$, and $w_l(i)$ are determined in such a manner that the values of $w_h(i)$, $w_m(i)$, and $w_l(i)$ decrease as i increases. The coefficients $w_h(0)$, $w_m(0)$, and $w_l(0)$ for i=0 are not required to satisfy the relationship $w_h(0)<w_m(0)\ w_l(0)$, and values satisfying the relationship $w_h(0)>w_m(0)$ and/or $w_m(0)>w_l(0)$ may be used.

Also in the third modification of the second embodiment, as in the first modification of the second embodiment, coefficients that can be transformed to linear prediction coefficients that suppress the generation of a spectral peak caused by a pitch component can be obtained even when the fundamental frequency of the input signal is high and coefficients that can be transformed to linear prediction coefficients that can express a spectral envelope can be obtained even when the fundamental frequency of the input signal is low, thereby making it possible to implement linear prediction with a higher analysis accuracy than before.

Third Embodiment

In a third embodiment, the coefficient $w_O(i)$ is determined by using a plurality of coefficient tables. The third embodiment differs from the first embodiment just in the method of determining the coefficient $w_O(i)$ in the coefficient determination unit 24 and is the same as the first embodiment in the other respects. The difference from the first embodiment will be described mainly, and a description of the same parts as in the first embodiment will be omitted.

Figure 5:
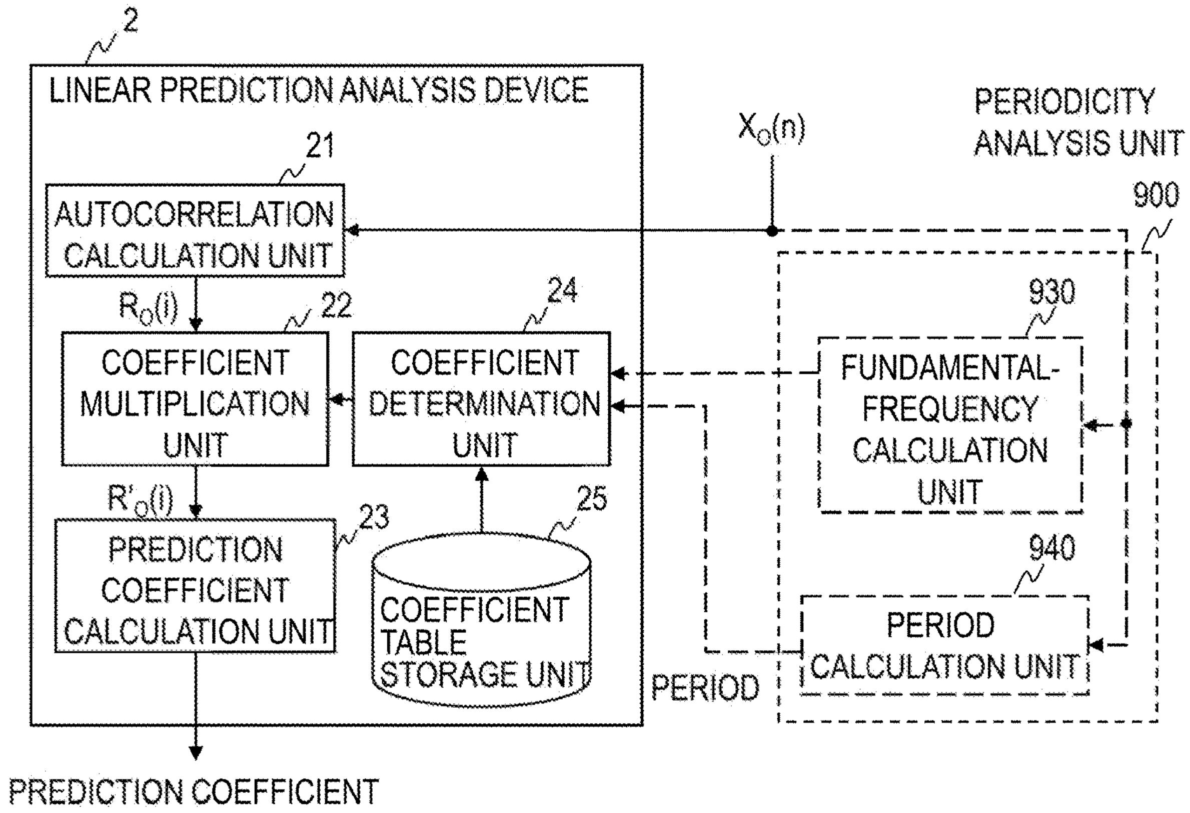
FIG. 5 is a block diagram illustrating an example of a linear prediction analysis device according to a third embodiment.

The linear prediction analysis device 2 in the third embodiment is the same as the linear prediction analysis device 2 in the first embodiment except for processing in the coefficient determination unit 24 and except that a coefficient table storage unit 25 is further included, as shown in FIG. 5. The coefficient table storage unit 25 stores two or more coefficient tables.

Figure 6:
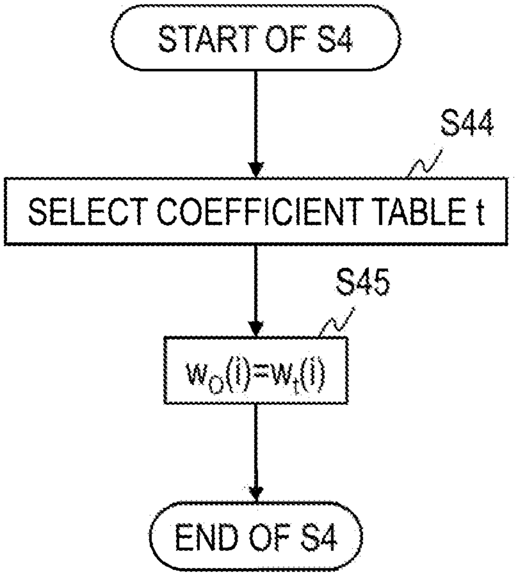
FIG. 6 is a flowchart illustrating an example of a linear prediction analysis method according to the third embodiment.

FIG. 6 shows an example flow of processing in the coefficient determination unit 24 in the third embodiment. The coefficient determination unit 24 in the third embodiment performs step S44 and step S45 in FIG. 6, for example.

The coefficient determination unit 24 uses a value that is positively correlated with the fundamental frequency corresponding to the input information about the fundamental frequency or a value that is negatively correlated with the fundamental frequency corresponding to the input information about the period and selects a single coefficient table t corresponding to the value that is positively correlated with the fundamental frequency or the value that is negatively correlated with the fundamental frequency, from the two or more coefficient tables stored in the coefficient table storage unit 25 (step S44). For example, the value that is positively correlated with the fundamental frequency corresponding to the information about the fundamental frequency is the fundamental frequency corresponding to the information about the fundamental frequency, and the value that is negatively correlated with the fundamental frequency corresponding to the input information about the period is the period corresponding to the input information about the period.

It is assumed, for example, that the coefficient table storage unit 25 stores two different coefficient tables t0 and t1, the coefficient table t0 stores coefficients $w_{t0}(i)$ ($i=0, 1, \ldots, P_{max}$), and the coefficient table t1 stores coefficients $w_{t1}(i)$ ($i=0, 1, \ldots, P_{max}$). The two coefficient tables t0 and t1 respectively store the coefficients $w_{t0}(i)$ ($i=0, 1, \ldots, P_{max}$) and the coefficients $w_{t1}(i)$ ($i=0, 1, \ldots, P_{max}$), which are determined to satisfy $w_{t0}(i)<w_{t1}(i)$ for some orders i at least and satisfy $w_{t0}(i)\leq w_{t1}(i)$ for the remaining orders i.

When the value that is positively correlated with the fundamental frequency is equal to or larger than a predetermined threshold, the coefficient determination unit 24 selects the coefficient table t0 as the coefficient table t, and otherwise, selects the coefficient table t1 as the coefficient table t. In other words, when the value that is positively correlated with the fundamental frequency is equal to or larger than the predetermined threshold, that is, when the fundamental frequency is judged to be high, the coefficient table for smaller coefficients for respective orders i is selected, and when the value that is positively correlated with the fundamental frequency is smaller than the predetermined threshold, that is, when the fundamental frequency is judged to be low, the coefficient table for larger coefficients for respective orders i is selected. In other words, when it is assumed that the coefficient table selected by the coefficient determination unit 24 when the value that is positively correlated with the fundamental frequency is a first value is a first coefficient table of the two coefficient tables stored in the coefficient table storage unit 25, and that the coefficient table selected by the coefficient determination unit 24 when the value that is positively correlated with the fundamental frequency is a second value smaller than the first value is a second coefficient table of the two coefficient tables stored in the coefficient table storage unit 25; for each of some orders i at least, the magnitude of the coefficient corresponding to the order i in the second coefficient table is larger than the magnitude of the coefficient corresponding to the order i in the first coefficient table.

Alternatively, the coefficient determination unit 24 selects the coefficient table t0 as the coefficient table t when the value that is negatively correlated with the fundamental frequency is equal to or smaller than a predetermined threshold, and otherwise, selects the coefficient table t1 as the coefficient table t. In other words, when the value that is negatively correlated with the fundamental frequency is equal to or smaller than the predetermined threshold, that is, when the period is judged to be short, the coefficient table for smaller coefficients for respective orders i is selected, and when the value that is negatively correlated with the fundamental frequency is larger than the predetermined threshold, that is, when the period is judged to be long, the coefficient table for larger coefficients for respective orders i is selected. In other words, when it is assumed that the coefficient table selected by the coefficient determination unit 24 when the value that is negatively correlated with the fundamental frequency is a first value is a first coefficient table of the two coefficient tables stored in the coefficient table storage unit 25, and that the coefficient table selected by the coefficient determination unit 24 when the value that is negatively correlated with the fundamental frequency is a second value larger than the first value is a second coefficient table of the two coefficient tables stored in the coefficient table storage unit 25; for each of some orders i at least, the magnitude of the coefficient corresponding to the order i in the second coefficient table is larger than the magnitude of the coefficient corresponding to the order i in the first coefficient table.

Coefficients $w_{t0}(0)$ and $w_{t1}(0)$ for i=0 in the coefficient tables t0 and t1 stored in the coefficient table storage unit 25 are not required to satisfy the relationship $w_{t0}(0) \le w_{t1}(0)$, and values satisfying the relationship $w_{t0}(0) > w_{t1}(0)$ may be used.

Alternatively, it is assumed that the coefficient table storage unit 25 stores three different coefficient tables t0, t1, and t2; the coefficient table t0 stores coefficients $w_{t0}(i)$ (i=0, 1, . . . , $P_{max}$); the coefficient table t1 stores coefficients $w_{t1}(i)$ (i=0, 1, . . . , $P_{max}$); and the coefficient table t2 stores coefficients $w_{t2}(i)$ (i 0, 1, . . . , $P_{max}$). The three coefficient tables t0, t1 and t2 respectively store the coefficients $w_{t0}(i)$ (i=0, 1, . . . , $P_{max}$), the coefficients $w_{t1}(i)$ (i=0, 1, . . . , $P_{max}$), and the coefficients $w_{t2}(i)$ (i=0, 1, . . . , $P_{max}$), which are determined to satisfy $w_{t0}(i) < w_{t1}(i) \le w_{t2}(i)$ for some orders i at least, satisfy $w_{t0}(i) \le w_{t1}(i) < w_{t2}(i)$ for some orders i at least of the other orders i, and satisfy $w_{t0}(i) \le w_{t1}(i) \le w_{t2}(i)$ for the remaining orders i.

It is also assumed that two thresholds th1' and th2' that satisfy the relationship 0<th1'<th2' are determined.

(1) When a value that is positively correlated with the fundamental frequency is larger than th2', that is, when the fundamental frequency is judged to be high, the coefficient determination unit 24 selects the coefficient table t0 as the coefficient table t; (2) when the value that is positively correlated with the fundamental frequency is larger than th1' and is equal to or smaller than th2', that is, when the fundamental frequency is judged to be intermediate, the coefficient determination unit 24 selects the coefficient table t1 as the coefficient table t; and (3) when the value that is positively correlated with the fundamental frequency is equal to or smaller than th1', that is, when the fundamental frequency is judged to be low, the coefficient determination unit 24 selects the coefficient table t2 as the coefficient table t.

It is also assumed that two thresholds th1 and th2 that satisfy the relationship 0<th1<th2 are determined.

(1) When a value that is negatively correlated with the fundamental frequency is equal to or larger than th2, that is, when the period is judged to be long, the coefficient determination unit 24 selects the coefficient table t2 as the coefficient table t;

(2) when the value that is negatively correlated with the fundamental frequency is equal to or larger than th1 and is smaller than th2, that is, when the period is judged to be intermediate, the coefficient determination unit 24 selects the coefficient table t1 as the coefficient table t; and (3) when the value that is negatively correlated with the fundamental frequency is smaller than th1, that is, when the period is judged to be short, the coefficient determination unit 24 selects the coefficient table t0 as the coefficient table t.

The coefficients $w_{t0}(0)$, $w_{t1}(0)$, and $w_{t2}(0)$ for i=0 in the coefficient tables t0, t1, and t2 stored in the coefficient table storage unit 25 are not required to satisfy the relationship $w_{t0}(0) \le w_{t1}(0) \le w_{t2}(0)$, and values satisfying the relationship $w_{t0}(0) > w_{t1}(0)$ and/or $w_{t1}(O) > w_{t2}(0)$ may be used.

The coefficient determination unit 24 sets the coefficient $w_t(i)$ for orders i stored in the selected coefficient table t as the coefficient $w_O(i)$ (step S45), that is, $w_O(i) = w_t(i)$. In other words, the coefficient determination unit 24 obtains the coefficient $w_t(i)$ corresponding to order i from the selected coefficient table t and sets the obtained coefficient $w_t(i)$ corresponding to order i as $w_O(i)$.

The third embodiment differs from the first and second embodiments in that the need for calculating the coefficient $w_O(i)$ on a basis of a function of a value that is positively correlated with the fundamental frequency or a value that is negatively correlated with the fundamental frequency is eliminated, and therefore, $w_O(i)$ can be determined through a smaller amount of processing.

The two or more coefficient tables stored in the coefficient table storage unit 25 can be described as follows.

It is assumed that a first coefficient table of the two or more coefficient tables stored in the coefficient table storage unit 25 is the coefficient table from which the coefficient determination unit 24 obtains the coefficient $w_O(i)$ (i=0, 1, . . . $P_{max}$) when the value that is positively correlated with the fundamental frequency is a first value; and that a second coefficient table of the two or more coefficient tables stored in the coefficient table storage unit 25 is the coefficient table from which the coefficient determination unit 24 obtains the coefficient $w_O(i)$ (i=0, 1, . . . , $P_{max}$) when the value that is positively correlated with the fundamental frequency is a second value smaller than the first value. Here, with respect to each of some orders i at least, the coefficient corresponding to the order i in the second coefficient table is larger than the coefficient corresponding to the order i in the first coefficient table.

It is assumed a first coefficient table of the two or more coefficient tables stored in the coefficient table storage unit 25 is the coefficient table from which the coefficient determination unit 24 obtains the coefficient $w_O(i)$ (i=0, 1, . . . , $P_{max}$) when the value that is negatively correlated with the fundamental frequency is a first value; and that a second coefficient table of the two or more coefficient tables stored in the coefficient table storage unit 25 is the coefficient table from which the coefficient determination unit 24 obtains the coefficient $w_O(i)$ (i=0, 1, . . . , $P_{max}$) when the value that is negatively correlated with the fundamental frequency is a second value larger than the first value. Here, with respect to each of some orders i at least, the coefficient corresponding to the order i in the second coefficient table is larger than the coefficient corresponding to the order i in the first coefficient table.

Specific Example of Third Embodiment

A specific example of the third embodiment will be described next. In this example, a quantized value of the period is used as a value that is negatively correlated with the fundamental frequency, and the coefficient table t is selected in accordance with the quantized value of the period.

Input to the linear prediction analysis device 2 are an input signal $X_O(n)$ (n=0, 1, . . . , N−1) which is a digital acoustic signal that has passed through a high-pass filter, that has been sampled at 128 kHz, that has been subjected to pre-emphasis, and that includes N samples per frame, and the period T calculated by the period calculation unit 940 with respect to a part of the input signal $X_O(n)$ (n=0, 1, . . . , Nn) (Nn is a predetermined positive integer satisfying the relationship Nn<N) of the current frame, as information about the period. The period T with respect to the part of the input signal $X_O(n)$ (n=0, 1, . . . , Nn) of the current frame is obtained and stored by including the part of the input signal $X_O(n)$ (n=0, 1, . . . , Nn) of the current frame in the signal segment of the frame preceding the input signal in the period calculation unit 940 and calculating the period with respect to $X_O(n)$ (n=0, I, . . . , Nn) in the processing for the signal segment of the preceding frame in the period calculation unit 940.

The autocorrelation calculation unit 21 calculates an autocorrelation $R_O(i)$ (i=0, 1, . . . , $P_{max}$) from the input signal $X_O(n)$ as given by expression (16) below.

[Formula 14]

$$R_O(i) = \sum_{n=i}^{N-1} X_O(n) \times X_O(n-i) \quad (16)$$

The period T is input to the coefficient determination unit 24, as the information of period. Here, it is assumed that the period T is within a range of 29≤T≤231. The coefficient determination unit 24 obtains an index D from the period T determined by the input information about the period T by the calculation of expression (17) given below. This index D is the value that is negatively correlated with the fundamental frequency and corresponds to the quantized value of the period.

$$D=\text{int}(T/110+0.5) \quad (17)$$

Figure 7:
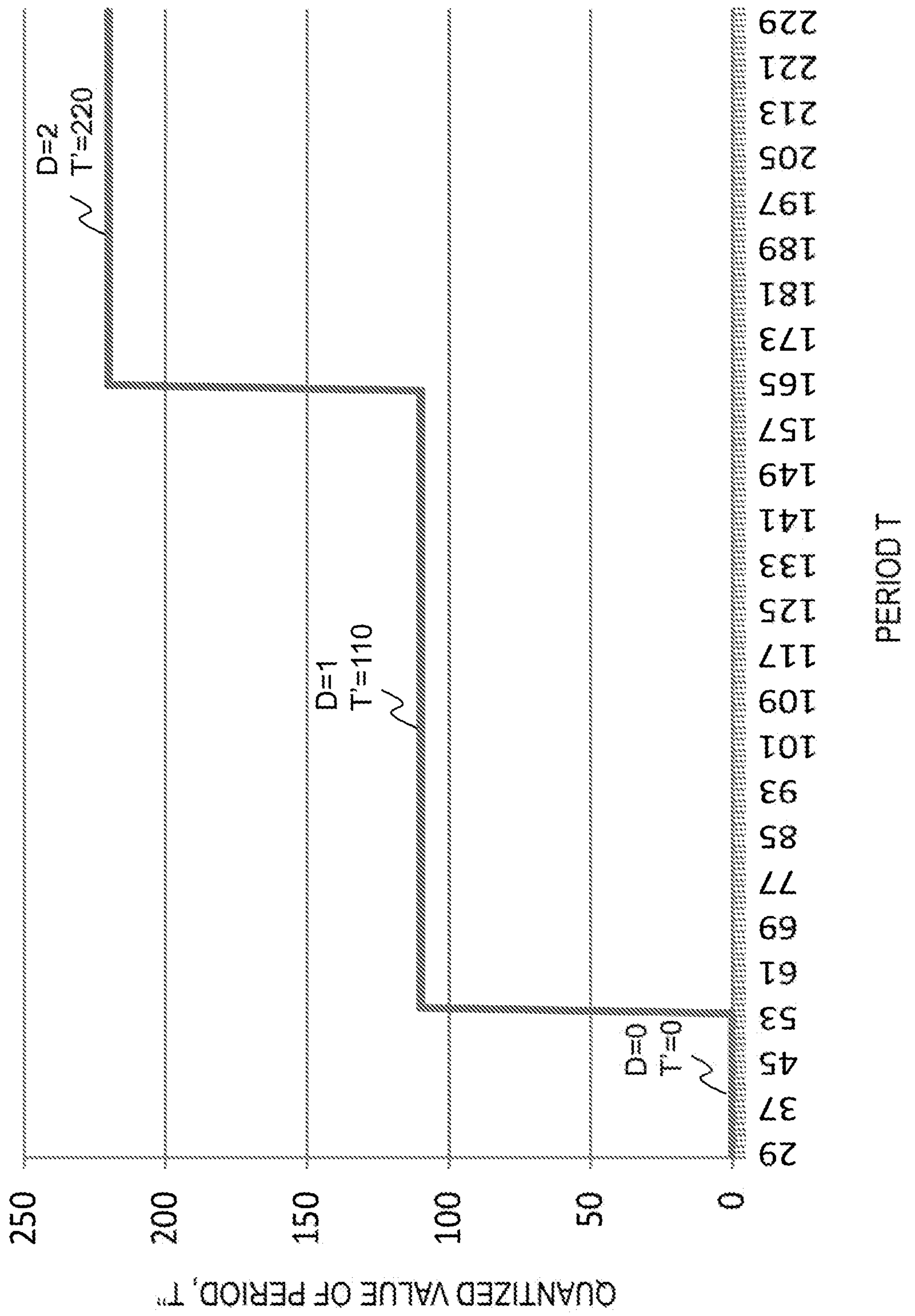
FIG. 7 is a view illustrating a specific example in the third embodiment.

Here, int indicates an integer function. The function drops the fractional portion of an input real number and outputs just the integer portion of the real number. FIG. 7 shows the relationship among the period T, the index D, and the quantized value T' of the period. In FIG. 7, the horizontal axis represents the period T, and the vertical axis represents the quantized value T' of the period. The quantized value T' of the period is given by T'=D×110. Since the period T satisfies 29≤T≤231, the value of index D is 0, 1, or 2. The index D may also be obtained not by using expression (17) but by using thresholds for the period T in such a manner that D=0 when 29≤T≤54, D=1 when 55≤T≤164, and D=2 when 165≤T≤231.

The coefficient table storage unit 25 stores a coefficient table t0 selected when D=0, a coefficient table t1 selected when D=1, and a coefficient table t2 selected when D=2.

The coefficient table t0 is a table of coefficients at $f_0$=60 Hz (corresponding to a half-value width of 142 Hz) of the conventional method given by expression (13), and the coefficients $w_{t0}(i)$ of respective orders are determined as follows:

$w_{t0}(i)$=[1.0, 0.999566371, 0.998266613, 0.996104103, 0.993084457, 0.989215493, 0.984507263, 0.978971839, 0.972623467, 0.96547842, 0.957554817, 0.948872864, 0.939454317, 0.929322779, 0.918503404, 0.907022834, 0.894909143]

The coefficient table t1 is a table of coefficients at $f_0$=50 Hz (corresponding to a half-value width of 116 Hz) given by expression (13), and the coefficients $w_{t1}(i)$ of respective orders are determined as follows.

$w_{t1}(i)$=[1.0, 0.999706, 0.998824, 0.997356, 0.995304, 0.992673, 0.989466, 0.985689, 0.98135, 0.976455, 0.971012, 0.965032, 0.958525, 0.951502, 0.943975, 0.935956, 0.927460]

The coefficient table t2 is a table of coefficients at $f_0$=25 Hz (corresponding to a half-value width of 58 Hz) given by expression (13), and the coefficients $w_{t2}(i)$ of respective orders are determined as follows.

$w_{t2}(i)$=[1.0, 0.999926, 0.999706, 0.999338, 0.998824, 0.998163, 0.997356, 0.996403, 0.995304, 0.99406, 0.992672, 0.99114, 0.989465, 0.987647, 0.985688, 0.983588, 0.981348]

The lists of $w_{t0}(i)$, $w_{t1}(i)$, and $w_{t2}(i)$ given above are sequences of the magnitude of coefficients corresponding to i=0, 1, 2, . . . , 16 in that order from the left up to $P_{max}$=16. In the example shown above, $w_{t0}(0)$=1.0, and $w_{t0}(3)$ =0.996104103, for example.

Figure 8:
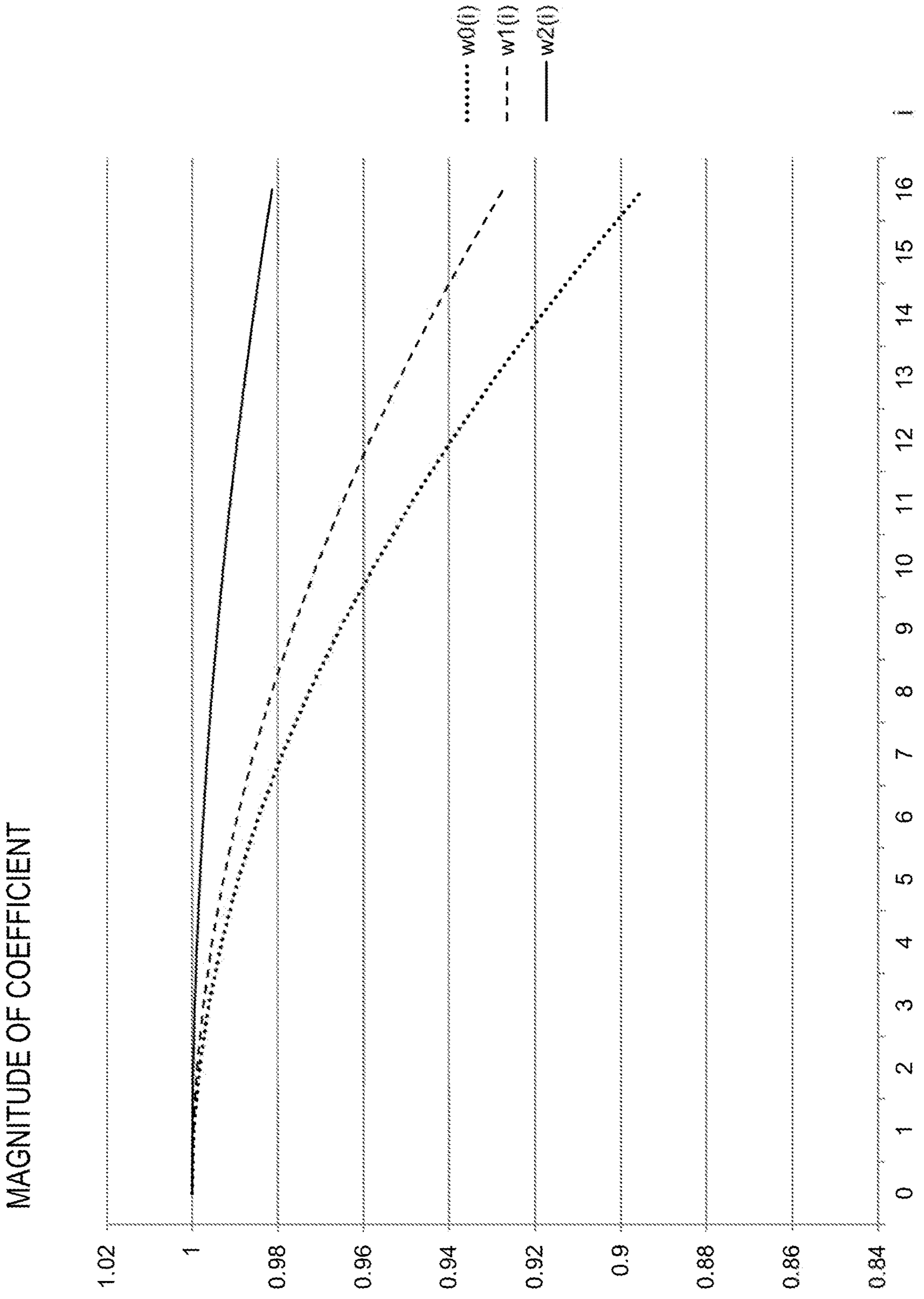
FIG. 8 is a view illustrating another specific example in the third embodiment.

FIG. 8 is a graph illustrating the magnitude of the coefficients $w_{t0}(i)$, $w_{t1}(i)$, $w_{t2}(i)$ for respective orders i in the coefficient tables. The horizontal axis in FIG. 8 represents the order i, and the vertical axis in FIG. 8 represents the magnitude of the coefficient. As understood from the graph, the magnitude of the coefficient decreases monotonically as the value of i increases in the coefficient tables. The magnitude of the coefficient in the different coefficient tables corresponding to the same value of i for i≥1 satisfies the relationship of $w_{t0}(i)<w_{t1}(i)<w_{t2}(i)$. That is, for i of i≥1, excluding 0, in other words, for some orders i at least, the magnitude of the coefficient increases monotonically with an increase in the index D. The plurality of coefficient tables stored in the coefficient table storage unit 25 should have the relationship described above for orders i other than i=0 and should not be limited to the example given above.

As indicated in non-patent literature 1 or 2, the coefficients fori=0 may be treated as an exception, and empirical values such as $w_{t0}(0)=w_{t1}(0)=w_{t2}(0)$=1.0001 or $w_{t0}(0)=w_{t1}(0)=w_{t2}(0)$=1.003 may be used. The coefficients for i=0 are not required to satisfy the relationship $w_{t0}(i)<w_{t1}(i)<w_{t2}(i)$, and $w_{t0}(0)$, $w_{t1}(0)$, and $w_{t2}(0)$ should not necessarily have the same value. Just for i=0, two or more values of $w_{t0}(0)$, $w_{t1}(0)$, and $w_{t2}(0)$ are not required to satisfy the relationship $w_{t0}(i)<w_{t1}(i)<w_{t2}(i)$ in magnitude, such as $w_{t0}(0)$=1.0001, $w_{t1}(0)$=1.0, and $w_{t2}(0)$=1.0, for example.

The coefficient determination unit 24 selects a coefficient table tD corresponding to the index D as the coefficient table t.

The coefficient determination unit 24 sets the coefficients $w_t(i)$ in the selected coefficient table t as the coefficient $w_O(i)$, that is, $w_O(i)=w_t(i)$. In other words, the coefficient determination unit 24 obtains the coefficient $w_t(i)$ corresponding to an order i from the selected coefficient table t and sets the obtained coefficient $w_t(i)$ corresponding to the order i as $w_O(i)$.

In the example described above, the coefficient tables t0, t1, and t2 are associated with the index D, but the coefficient tables t0, t1, and t2 may also be associated with a value that is positively correlated with the fundamental frequency or a value that is negatively correlated with the fundamental frequency, other than index D.

Modification of Third Embodiment

A coefficient stored in one of the plurality of coefficient tables is determined as the coefficient $w_O(i)$ in the third embodiment. In a modification of the third embodiment, the coefficient $w_O(i)$ is also determined by arithmetic processing based on the coefficients stored in the plurality of coefficient tables.

The functional configuration of the linear prediction analysis device 2 in the modification of the third embodiment is the same as that in the third embodiment, shown in FIG. 5. The linear prediction analysis device 2 in the modification of the third embodiment is the same as the linear prediction analysis device 2 in the third embodiment except for processing in the coefficient determination unit 24 and coefficient tables included in the coefficient table storage unit 25.

The coefficient table storage unit 25 stores just coefficient tables t0 and t2. The coefficient table t0 stores coefficients $w_{t0}(i)$ (i=0, 1, . . . , $P_{max}$), and the coefficient table t2 stores coefficients $w_{t2}(i)$ (i=0, 1, . . . , $P_{max}$). The two coefficient tables t0 and t2 respectively store the coefficients $w_{t0}(i)$ (i=0, 1, . . . , $P_{max}$) and the coefficients $w_{t2}(i)$ (i=0, 1, . . . , $P_{max}$), which are determined to satisfy $w_{t0}(i)<w_{t2}(i)$ for some orders i at least and satisfy $w_{t0}(i)\le w_{t2}(i)$ for the remaining orders i.

It is assumed that two thresholds th1' and th2' that satisfy the relationship 0<th1'<th2' are determined.

(1) When a value that is positively correlated with the fundamental frequency is larger than th2', that is, when the fundamental frequency is judged to be high, the coefficient determination unit 24 selects the coefficients $w_{t0}(i)$ in the coefficient table t0 as the coefficients $w_O(i)$;

(2) when the value that is positively correlated with the fundamental frequency is equal to or smaller than th2' and is larger than th1', that is, when the fundamental frequency is judged to be intermediate, the coefficient determination unit 24 determines the coefficients $w_O(i)$ by using the coefficients $w_{t0}(i)$ in the coefficient table t0 and the coefficients $w_{t2}(i)$ in the coefficient table t2 to calculate $w_O(i)=\beta'\times w_{t0}(i)+(1-\beta')\times w_{t2}(i)$; and (3) when the value that is positively correlated with the fundamental frequency is equal to or smaller than th1', that is, when the fundamental frequency is judged to be low, the coefficient determination unit 24 selects the coefficients $w_{t2}(i)$ in the coefficient table t2 as the coefficients $w_O(i)$. Here, β' satisfies $0\le\beta'\le1$, and is obtained from the fundamental frequency P by a function β'=c(P) in which the value of β' decreases with a decrease in the fundamental frequency P and the value of β' increases with an increase in the fundamental frequency P. With this configuration, when the fundamental frequency P is small in the midrange of the fundamental frequency, a value close to $w_{t2}(i)$ can be determined as the coefficient $w_O(i)$; and when the fundamental frequency P is large in the midrange of the fundamental frequency, a value close to $w_{t0}(i)$ can be determined as the coefficient $w_O(i)$. Therefore, three or more kinds of coefficients $w_O(i)$ can be obtained with just two tables.

Alternatively, it is assumed that two thresholds th1 and th2 that satisfy the relationship 0<th1<th2 are determined.

(1) When a value that is negatively correlated with the fundamental frequency is equal to or larger than th2, that is, when the period is judged to be long, the coefficient determination unit 24 selects the coefficients $w_{t2}(i)$ in the coefficient table t2 as the coefficients $w_O(i)$;

(2) when the value that is negatively correlated with the fundamental frequency is smaller than th2 and is equal to or larger than th1, that is, when the period is judged to be intermediate, the coefficient determination unit 24 determines the coefficients $w_O(i)$ by using the coefficients $w_{t0}(i)$ in the coefficient table t0 and the coefficients $w_{t2}(i)$ in the coefficient table t2 to calculate $w_O(i)$ $(1-\beta)\times w_{t0}(i)+\beta\times w_{t2}(i)$;

(3) when the value that is negatively correlated with the fundamental frequency is smaller than th1, that is, when the period is judged to be short, the coefficient determination unit 24 selects the coefficients $w_{t0}(i)$ in the coefficient table t0 as the coefficients $w_O(i)$. Here, β satisfies $0\le\beta\le1$, and is obtained from the period T by a function β=b(T) in which the value of β decreases with a decrease in the period T and the value of β increases with an increase in the period T. With this configuration, when the period T is short in the midrange of the period, a value close to $w_{t0}(i)$ can be determined as the coefficient $w_O(i)$; and when the period T is long in the midrange of the period, a value close to $w_{t2}(i)$ can be determined as the coefficient $w_O(i)$. Therefore, three or more kinds of coefficients $w_O(i)$ can be obtained with just two tables.

The coefficients $w_{t0}(0)$ and $w_{t2}(0)$ for i=0 in the coefficient tables t0 and t2 stored in the coefficient table storage unit 25 are not required to satisfy the relationship $w_{t0}(0)\le w_{t2}(0)$, and values satisfying the relationship $w_{t0}(0)>w_{t2}(0)$ may be used.

Common Modification of First to Third Embodiments

Figure 10:
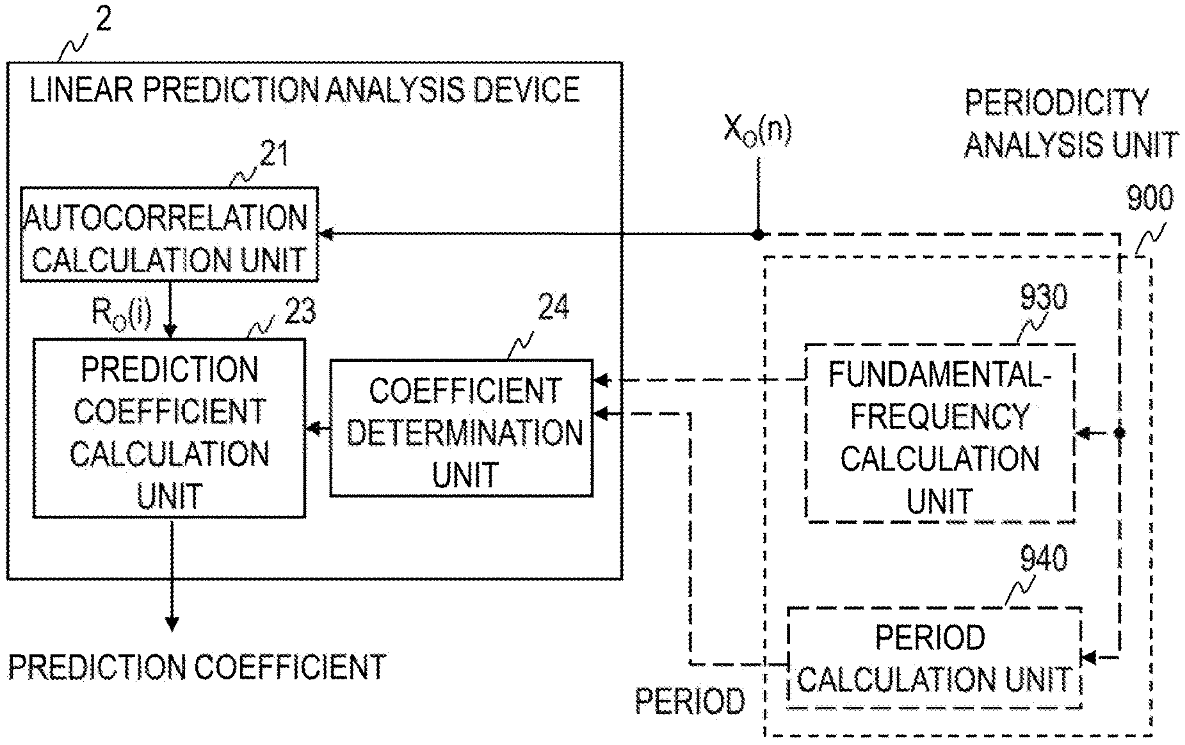
FIG. 10 is a block diagram illustrating a modification.
Figure 11:
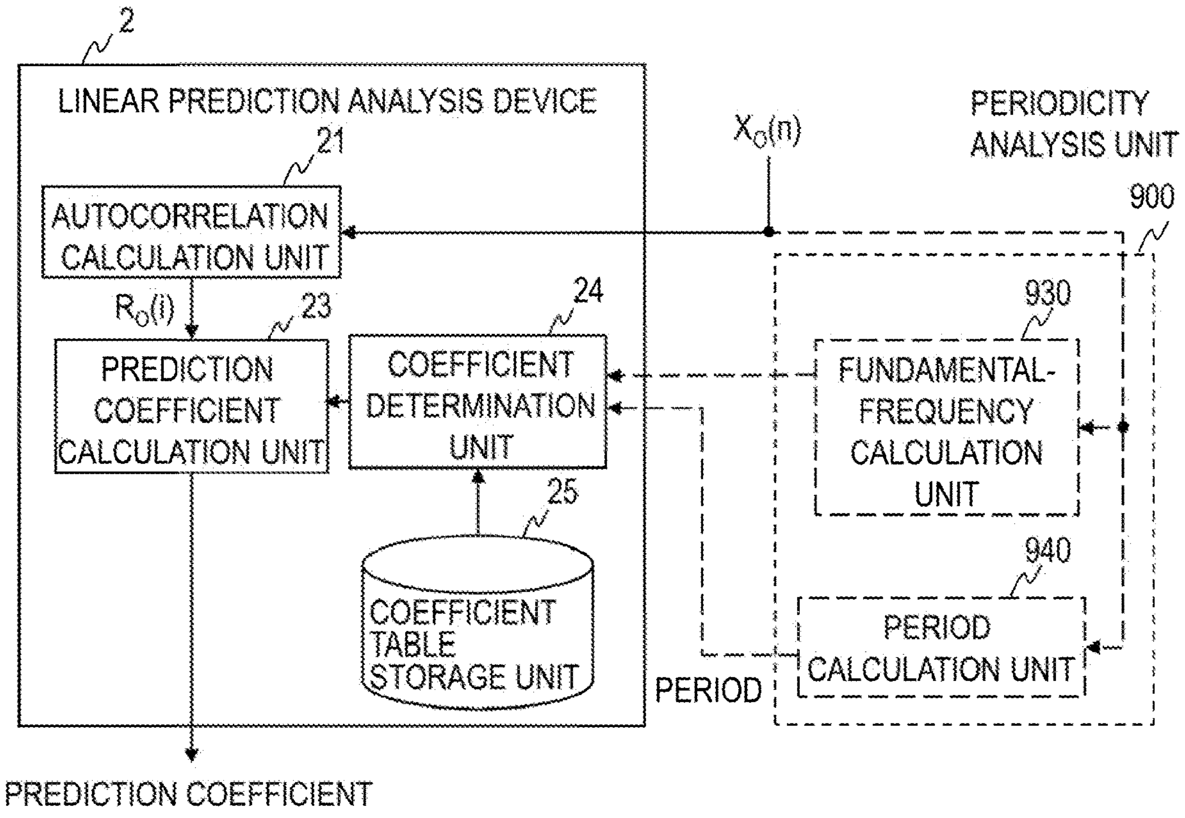
FIG. 11 is a block diagram illustrating another modification.
Figure 12:
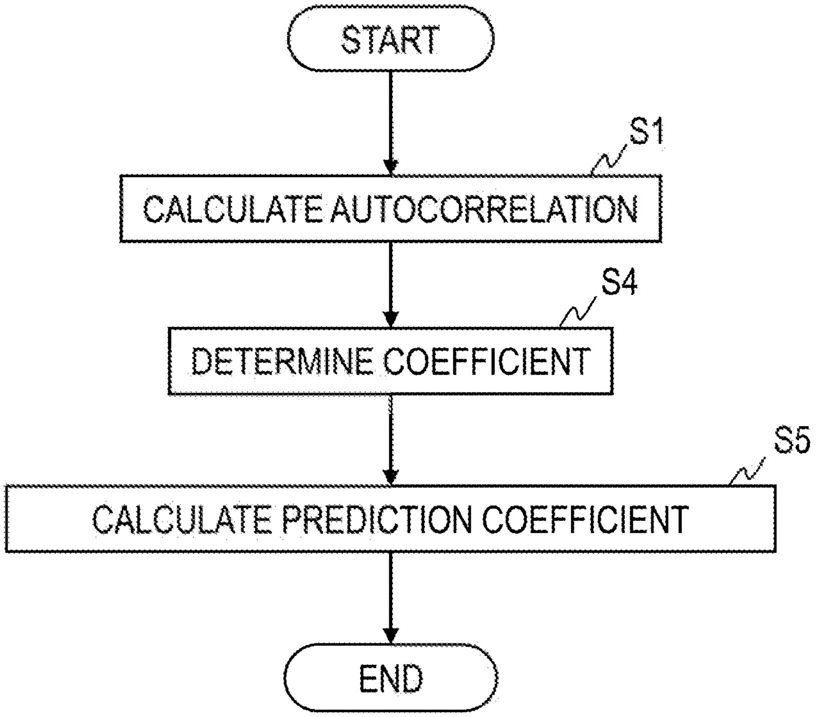
FIG. 12 is a flowchart illustrating a modification.

As shown in FIGS. 10 and 11, in all the modifications and all the embodiments described above, the coefficient multiplication unit 22 may be omitted, and the prediction coefficient calculation unit 23 may perform linear prediction analysis by using the coefficient $w_O(i)$ and the autocorrelation $R_O(i)$. FIGS. 10 and 11 show configurations of the linear prediction analysis device 2 corresponding respectively to FIGS. 1 and 5. With these configurations, the prediction coefficient calculation unit 23 performs linear prediction analysis not by using the modified autocorrelation $R'_O(i)$ obtained by multiplying the coefficient $w_O(i)$ by the autocorrelation $R_O(i)$ but by using the coefficient $w_O(i)$ and the autocorrelation $R_O(i)$ directly (step S5), as shown in FIG. 12.

Fourth Embodiment

In a fourth embodiment, a conventional linear prediction analysis device is used for an input signal $X_O(n)$ to perform linear prediction analysis; a fundamental-frequency calculation unit obtains a fundamental frequency by using the result of the linear prediction analysis; a linear prediction analysis device according to the present invention obtains coefficients that can be transformed to linear prediction coefficients, by using a coefficient $w_O(i)$ based on the obtained fundamental frequency.

Figure 13:
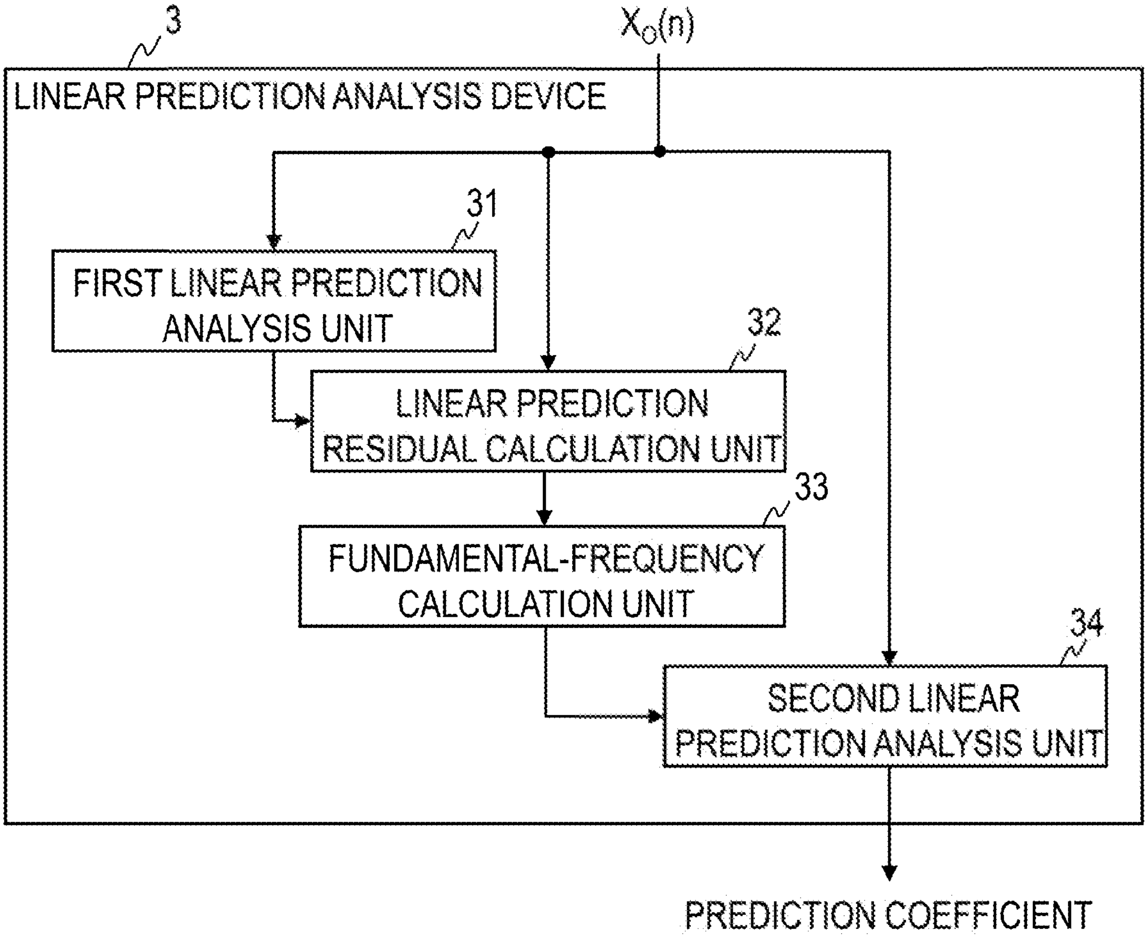
FIG. 13 is a block diagram illustrating an example of a linear prediction analysis device according to a fourth embodiment.

A linear prediction analysis device 3 according to the fourth embodiment includes a first linear prediction analysis unit 31, a linear prediction residual calculation unit 32, a fundamental-frequency calculation unit 33, and a second linear prediction analysis unit 34, for example, as shown in FIG. 13.

[First Linear Prediction Analysis Unit 31]

The first linear prediction analysis unit 31 works in the same way as the conventional linear prediction analysis device 1. The first linear prediction analysis unit 31 obtains an autocorrelation $R_O(i)$ (i=0, 1, . . . , $P_{max}$) from the input signal $X_O(n)$, obtains a modified autocorrelation $R'_O(i)$ (i=0, 1, . . . , $P_{max}$) by multiplying the autocorrelation $R_O(i)$ (i=0, 1, . . . , $P_{max}$) by a predetermined coefficient $w_O(i)$ (i=0, 1, . . . , $P_{max}$) for each i, and obtains from the modified autocorrelation $R'_O(i)$ (i=0, 1, . . . , $P_{max}$), coefficients that can be transformed to first-order to $P_{max}$-order, which is a predetermined maximum order, linear prediction coefficients.

[Linear Prediction Residual Calculation Unit 32]

The linear prediction residual calculation unit 32 calculates a linear prediction residual signal $X_R(n)$ by applying linear prediction based on the coefficients that can be transformed to the first-order to $P_{max}$-order linear prediction coefficients or filtering equivalent to or similar to the linear prediction, to the input signal $X_O(n)$. Since filtering can also be referred to as weighting, the linear prediction residual signal $X_R(n)$ can also be referred to as a weighted input signal.

[Fundamental-Frequency Calculation Unit 33]

The fundamental-frequency calculation unit 33 calculates the fundamental frequency P of the linear prediction residual signal $X_R(n)$ and outputs information about the fundamental frequency. There are a variety of known methods of obtaining the fundamental frequency, and any of those known methods can be used. The fundamental-frequency calculation unit 33 obtains the fundamental frequency of each of a plurality of subframes constituting the linear prediction residual signal $X_R(n)$ (n=0, 1, . . . , N−1) of the current frame, for example. That is, the fundamental frequencies $P_{s1}, \ldots, P_{sM}$ of M subframes $X_{Rs1}(n)$ (n=0, 1, . . . , N/M−1), . . . , $X_{RsM}(n)$ (n=(M−1)N/M, (M−1)N/M+L, . . . , N−1), where M is an integer not smaller than 2, are obtained. It is assumed that N is divisible by M. The fundamental-frequency calculation unit 33 outputs information that can determine the maximum value $\max(P_{s1}, \ldots, P_{sM})$ of the fundamental frequencies $P_{s1}, \ldots, P_{sM}$ of the M subframes constituting the current frame, as the information about the fundamental frequency.

[Second Linear Prediction Analysis Unit 34]

The second linear prediction analysis unit 34 works in the same way as the linear prediction analysis device 2 in the first to third embodiments, the linear prediction analysis device 2 in the second modification of the second embodiment, the linear prediction analysis device 2 in the modification of the third embodiment, or the linear prediction analysis device 2 in the common modification of the first to third embodiments. The second linear prediction analysis unit 34 obtains an autocorrelation $R_O(i)$ (i=0, 1, . . . , $P_{max}$) from the input signal $X_O(n)$, determines the coefficient $w_O(i)$ (i=0, 1, . . . , $P_{max}$) on the basis of the information about the fundamental frequency output from the fundamental-frequency calculation unit 33, and obtains coefficients that can be transformed to first-order to $P_{max}$-order, which is a predetermined maximum order, linear prediction coefficients, by using the autocorrelation $R_O(i)$ (i=0, 1, . . . , $P_{max}$) and the determined coefficient $w_O(i)$ (i 0, 1, . . . , $P_{max}$).

Modification of Fourth Embodiment

In a modification of the fourth embodiment, a conventional linear prediction analysis device is used for an input signal $X_O(n)$ to perform linear prediction analysis; a period calculation unit obtains a period by using the result of the linear prediction analysis; and a linear prediction analysis device according to the present invention obtains coefficients that can be transformed to linear prediction coefficients, by using a coefficient $w_O(i)$ based on the obtained period.

Figure 14:
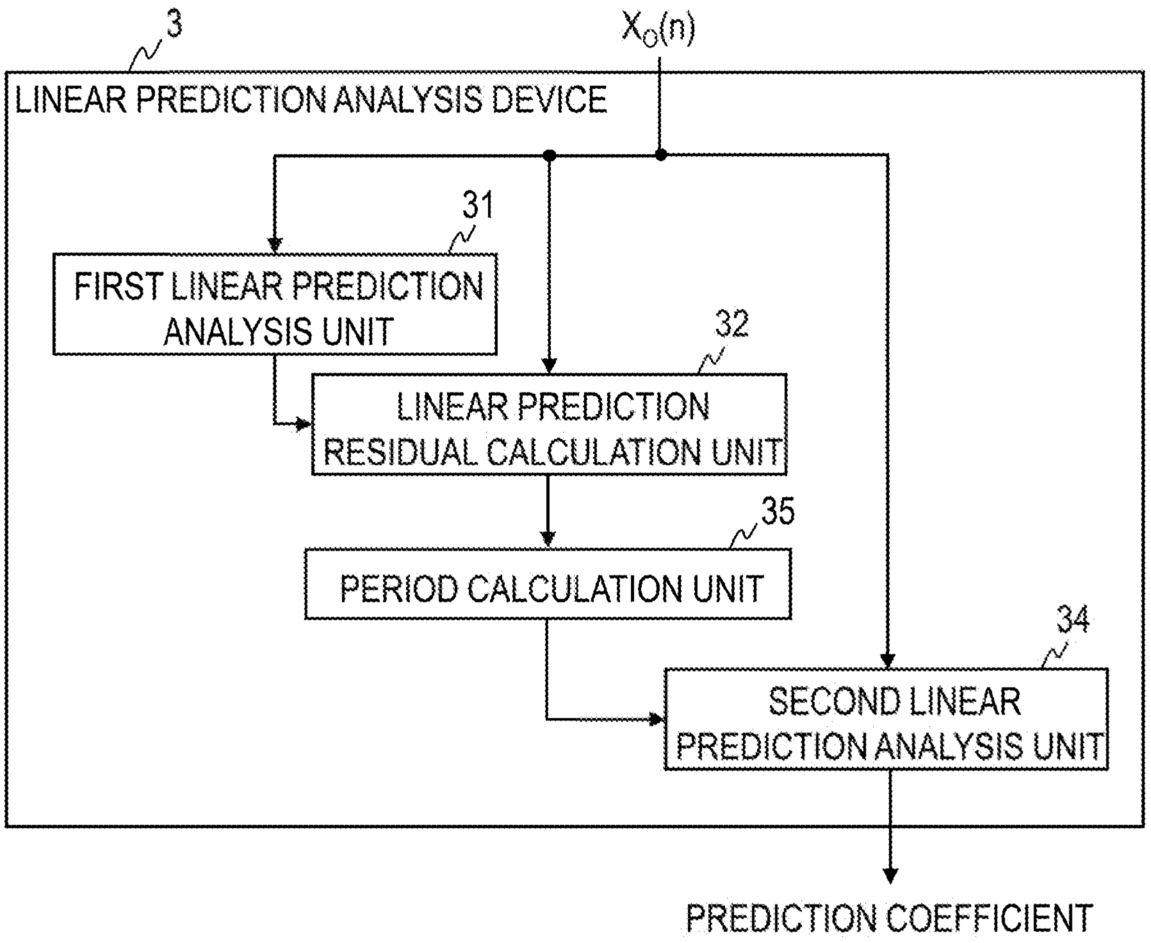
FIG. 14 is a block diagram illustrating an example of a linear prediction analysis device according to a modification of the fourth embodiment.
Figure 15:
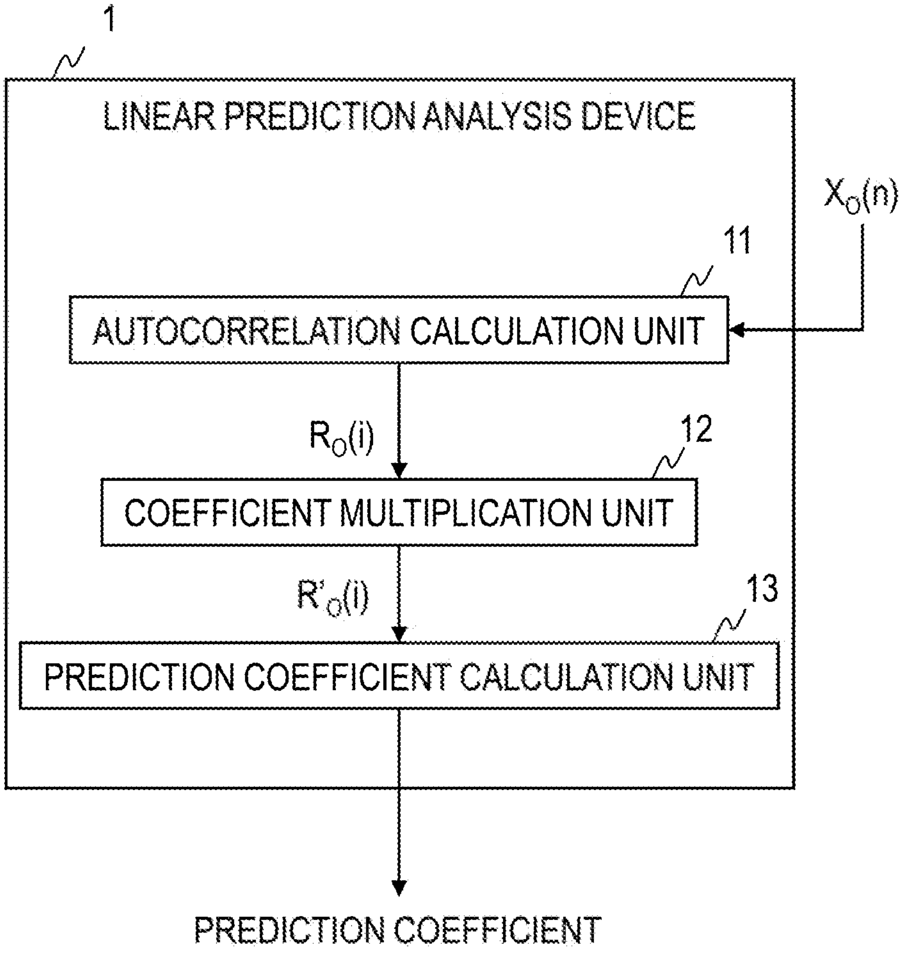
FIG. 15 is a block diagram illustrating an example of a conventional linear prediction device.

A linear prediction analysis device 3 according to the modification of the fourth embodiment includes a first linear prediction analysis unit 31, a linear prediction residual calculation unit 32, a period calculation unit 35, and a second linear prediction analysis unit 34, for example, as shown in FIG. 14. The first linear prediction analysis unit 31 and the linear prediction residual calculation unit 32 of the linear prediction analysis device 3 in the modification of the fourth embodiment are the same as those in the linear prediction analysis device 3 in the fourth embodiment. The difference from the fourth embodiment will be mainly described.

[Period Calculation Unit 35]

The period calculation unit 35 obtains the period T of a linear prediction residual signal $X_R(n)$ and outputs information about the period. There are a variety of known methods of obtaining the period, and any of those known methods can be used. The period calculation unit 35 calculates the period of each of a plurality of subframes constituting the linear prediction residual signal $X_R(n)$ (n=0, 1, . . . , N−1) of the current frame, for example. The periods $T_{s1}, \ldots, T_{sM}$ of M subframes $X_{Rs1}(n)$ (n=0, 1, . . . , N/M−1), . . . , $X_{RsM}(n)$ (n=(M−1)N/M, (M−1)N/M+1, . . . , N−1), where M is an integer not smaller than 2, are obtained. It is assumed that N is divisible by M. The period calculation unit 35 outputs information that can determine the minimum value $\min(T_{s1} \ldots, T_{sM})$ of the periods $T_{s1}, \ldots, T_{sM}$ of the M subframes constituting the current frame, as the information of period.

[Second Linear Prediction Analysis Unit 34 in Modification]

The second linear prediction analysis unit 34 in the modification of the fourth embodiment works in the same way as the linear prediction analysis device 2 in the modification of the first embodiment, the linear prediction analysis device 2 in the first modification of the second embodiment, the linear prediction analysis device 2 in the third modification of the second embodiment, the linear prediction analysis device 2 in the third embodiment, the linear prediction analysis device 2 in the modification of the third embodiment, or the linear prediction analysis device 2 in the common modification of the first to third embodiments. The second linear prediction analysis unit 34 obtains an autocorrelation $R_O(i)$ (i=0, 1, . . . , $P_{max}$) from the input signal $X_O(n)$, determines a coefficient $w_O(i)$ (i=0, 1, . . . , $P_M$) on the basis of the information about the period output from the period calculation unit 35, and obtains coefficients that can be transformed to first-order to $P_{max}$-order, which is a predetermined maximum order, linear prediction coefficients, by using the autocorrelation $R_O(i)$ (i=0, 1, . . . , $P_{max}$) and the determined coefficient $w_O(i)$ (i=0, 1, . . . , $P_{max}$).

<Value that is Positively Correlated with Fundamental Frequency>

As described in specific example 2 of the fundamental-frequency calculation unit 930 in the first embodiment, the fundamental frequency of a part corresponding to a sample of the current frame, of a sample portion to be read and used in advance, also called a look-ahead portion, in the signal processing for the preceding frame can be used as a value that is positively correlated with the fundamental frequency.

An estimated value of the fundamental frequency may also be used as a value that is positively correlated with the fundamental frequency. For example, an estimated value of the fundamental frequency of the current frame predicted from the fundamental frequencies of a plurality of past frames or the average, the minimum value, or the maximum value of the fundamental frequencies of a plurality of past frames can be used as an estimated value of the fundamental frequency. Alternatively, the average, the minimum value, or the maximum value of the fundamental frequencies of a plurality of subframes can also be used as an estimated value of the fundamental frequency.

A quantized value of the fundamental frequency can also be used as a value that is positively correlated with the fundamental frequency. The fundamental frequency prior to quantization can be used, and the fundamental frequency after quantization can also be used.

Further, the fundamental frequency for an analyzed channel of a plurality of channels, such as stereo channels, can be used as a value that is positively correlated with the fundamental frequency.

<Value that is Negatively Correlated with Fundamental Frequency>

As described in specific example 2 of the period calculation unit 940 in the first embodiment, the period of a part corresponding to a sample of the current frame, of a sample portion to be read and used in advance, also called a look-ahead portion, in the signal processing for the preceding frame can be used as a value that is negatively correlated with the fundamental frequency.

An estimated value of the period can also be used as a value that is negatively correlated with the fundamental frequency. For example, an estimated value of the period of the current frame predicted from the fundamental frequencies of a plurality of past frames or the average, the minimum value, or the maximum value of the periods of a plurality of past frames can be used as an estimated value of the period. Alternatively, the average, the minimum value, or the maximum value of the periods of a plurality of subframes can be used as an estimated value of the period. An estimated value of the period of the current frame predicted from the fundamental frequencies of a plurality of past frames and a part corresponding to a sample of the current frame, of a sample portion read and used in advance, also called a look-ahead portion, can also be used. Likewise, the average, the minimum value, or the maximum value of the fundamental frequencies of a plurality of past frames and a part corresponding to a sample of the current frame, of a sample portion read and used in advance, also called a look-ahead portion, can be used.

A quantized value of the period can also be used as a value that is negatively correlated with the fundamental frequency. The period before quantization can be used, and the period after quantization can also be used.

Further, the period for an analyzed channel of a plurality of channels, such as stereo channels, can be used as a value that is negatively correlated with the fundamental frequency.

With regard to comparison between a value that is positively correlated with the fundamental frequency or a value that is negatively correlated with the fundamental frequency and a threshold in the embodiments and the modifications described above, when the value that is positively correlated with the fundamental frequency or the value that is negatively correlated with the fundamental frequency is equal to the threshold, the value should fall in either of the two ranges bordering across the threshold. For example, a criterion of equal to or larger than a threshold may be changed to a criterion of larger than the threshold, and then a criterion of smaller than the threshold needs to be changed to a criterion of equal to or smaller than the threshold. A criterion of larger than a threshold may be changed to a criterion of equal to or larger than the threshold, and then a criterion of equal to or smaller than the threshold needs to be changed to a criterion of smaller than the threshold.

The processing described with the above devices or methods may be executed not only in the order in which it is described but also in parallel or separately, depending on the processing capability of the devices executing the processing or as required.

If the steps of the linear prediction analysis methods are implemented by a computer, the processing details of the functions that should be used in the linear prediction analysis methods are written as a program. By executing the program on the computer, the corresponding steps are implemented on the computer.

The program describing the processing details can be recorded on a computer-readable recording medium. The computer-readable recording medium can take a variety of forms, such as a magnetic recording device, an optical disk, a magneto-optical recording medium, and a semiconductor memory.

The processing means may be configured by executing a predetermined program on the computer, and at least a part of the processing details may be implemented by hardware.

Needless to say, changes can be made appropriately without departing from the scope of the invention.

What is claimed is:

1. A linear prediction analysis method of obtaining, in each frame, which is a predetermined time interval, linear prediction coefficients corresponding to an input time-series signal, the linear prediction analysis method comprising:

a step of receiving the input time-series signal, the time-series signal being a speech signal or an acoustic signal;

an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ samples after the input time-series signal $X_O(n)$, for each i of $i=0, 1, \ldots, P_{max}$ at least; and a prediction coefficient calculation step of calculating first-order to $P_{max}$-order linear prediction coefficients, by using a modified autocorrelation $R'_O(i)$ obtained by multiplying a coefficient $w_O(i)$ by the autocorrelation $R_O(i)$ for each i, wherein a case where, for at least part of each order i, the coefficient $w_O(i)$ corresponding to the order i is in a monotonically increasing relationship with an increase in a period, a quantized value of the period, an estimated value of the period or a value that is negatively correlated with a fundamental frequency based on the input time-series signal of the current frame or a past frame, is comprised, and wherein the calculated first-order to $P_{max}$-order linear prediction coefficients are used for encoding or analyzing the speech signal or the acoustic signal.

2. A linear prediction analysis method of obtaining, in each frame, which is a predetermined time interval, linear prediction coefficients corresponding to an input time-series signal, the linear prediction analysis method comprising:

a step of receiving the input time-series signal, the time-series signal being a speech signal or an acoustic signal;

an autocorrelation calculation step of calculating an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ samples after the input time-series signal $X_O(n)$, for each i of $i=0, 1, \ldots, P_{max}$ at least; and a prediction coefficient calculation step of calculating first-order to $P_{max}$-order linear prediction coefficients, by using a modified autocorrelation $R'_O(i)$ obtained by multiplying a coefficient $w_O(i)$ by the autocorrelation $R_O(i)$ for each i;

wherein a case where, for at least part of each order i, the coefficient $w_O(i)$ corresponding to the order i is in a monotonically decreasing relationship with an increase in a fundamental frequency, a quantized value of the fundamental frequency, an estimated value of the fundamental frequency or a value that is positively correlated with the fundamental frequency based on the input time-series signal of the current or a past frame, is comprised, and wherein the calculated first-order to $P_{max}$-order linear prediction coefficients are used for encoding or analyzing the speech signal or the acoustic signal.

3. A linear prediction analysis device that obtains, in each frame, which is a predetermined time interval, linear prediction coefficients corresponding to an input time-series signal, the linear prediction analysis device comprising:

processing circuitry configured to receive the input time-series signal, the time-series signal being a speech signal or an acoustic signal;

calculate an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of i=0, $P_{max}$ at least; and calculate first-order to $P_{max}$-order linear prediction coefficients, by using a modified autocorrelation $R'_O(i)$ obtained by multiplying a coefficient $w_O(i)$ by the autocorrelation $R_O(i)$ for each i;

wherein a case where, for at least part of each order i, the coefficient $w_O(i)$ corresponding to the order i is in a monotonically increasing relationship with an increase in a period, a quantized value of the period, an estimated value of the period or a value that is negatively correlated with a fundamental frequency based on the input time-series signal of the current frame or a past frame, is comprised, and wherein the calculated first-order to $P_{max}$-order linear prediction coefficients are used for encoding or analyzing the speech signal or the acoustic signal.

4. A linear prediction analysis device that obtains, in each frame, which is a predetermined time interval, linear prediction coefficients corresponding to an input time-series signal, the linear prediction analysis device comprising:

processing circuitry configured to receive the input time-series signal, the time-series signal being a speech signal or an acoustic signal;

calculate an autocorrelation $R_O(i)$ between an input time-series signal $X_O(n)$ of a current frame and an input time-series signal $X_O(n-i)$ i samples before the input time-series signal $X_O(n)$ or an input time-series signal $X_O(n+i)$ i samples after the input time-series signal $X_O(n)$, for each i of i=0, 1, . . . , $P_{max}$ at least; and calculate first-order to $P_{max}$-order linear prediction coefficients, by using a modified autocorrelation $R'_O(i)$ obtained by multiplying a coefficient $w_O(i)$ by the autocorrelation $R_O(i)$ for each i;

wherein a case where, for at least part of each order i, the coefficient $w_O(i)$ corresponding to the order i is in a monotonically decreasing relationship with an increase in a fundamental frequency, a quantized value of the fundamental frequency, an estimated value of the fundamental frequency or a value that is positively conelated with the fundamental frequency based on the input time-series signal of the current frame or a past frame, is comprised, and wherein the calculated first-order to $P_{max}$-order linear prediction coefficients are used for encoding or analyzing the speech signal or the acoustic signal.

5. A non-transitory computer-readable recording medium on which a program for causing a computer to operate as the units of the linear prediction analysis device according to claim 3 is recorded.

6. A non-transitory computer-readable recording medium on which a program for causing a computer to operate as the units of the linear prediction analysis device according to claim 4 is recorded.

* * * * *